US012739841B2

(12) United States Patent
Roessel et al.

(10) Patent No.: US 12,739,841 B2
(45) Date of Patent: Sep. 15, 2026

(54) ELECTRONIC DEVICES WITH DELAY-BASED DISTRIBUTED COMPUTING

(71) Applicant: Apple Inc., Cupertino, CA (US)

(72) Inventors: Sabine Roessel, Munich (DE); Bernhard Raaf, Neuried (DE); Robert Zaus, Munich (DE); Christian Drewes, Germering (DE); Matthias Sauer, San Jose, CA (US); Josef Hausner, Germering (DE)

(73) Assignee: Apple Inc., Cupertino, CA (US)

( * ) Notice: Subject to any disclaimer, the term of this patent is extended or adjusted under 35 U.S.C. 154(b) by 982 days.

(21) Appl. No.: 17/896,879

(22) Filed: Aug. 26, 2022

(65) Prior Publication Data

US 2024/0073912 A1 Feb. 29, 2024

(51) Int. Cl.
*H04W 72/23* (2023.01)
*G06F 9/48* (2006.01)
(Continued)

(52) U.S. Cl.
CPC .......... *H04W 72/23* (2023.01); *G06F 9/4881* (2013.01); *G06F 9/5027* (2013.01); *H04W 12/06* (2013.01);
(Continued)

(58) Field of Classification Search
None
See application file for complete search history.

(56) References Cited

U.S. PATENT DOCUMENTS 6,446,132 B1 * 9/2002 Kikuchi ................ H04W 40/34 455/445
8,505,011 B2 * 8/2013 Isaka ..................... G06F 9/5038 718/100
9,977,695 B2 5/2018 Helander et al.
10,013,282 B2 7/2018 Calvanese Strinati et al.
(Continued)

FOREIGN PATENT DOCUMENTS

WO 2021194583 A1 9/2021

OTHER PUBLICATIONS

Xiaowen Gong; "Delay-Optimal Distributed Edge Computing in Wireless Edge Networks"; arXiv:2002.02596v1 [cs.NI] Feb. 7, 2020; (Gong_2020.pdf). (Year: 2020).*
(Continued)

*Primary Examiner* — Hiren P Patel
(74) *Attorney, Agent, or Firm* — Treyz Law Group, P.C.; Michael H. Lyons

(57) ABSTRACT

A primary device may run a software application requiring a compute task. The primary device may receive statistics from a set of secondary devices over wireless communication links. The primary device may process the statistics to determine whether the compute task will be offloaded to the secondary devices or performed locally. The primary device may generate a distribution scheme for the secondary devices based on the statistics. This may involve modeling first delays associated with transmission of signals from the primary device to the secondary devices, second delays associated with transmission of compute results from the secondary devices to the primary device, and third delays associated with processing resources of the secondary devices. The optimized distribution scheme may minimize overall runtime of the compute task given the modeled delays, scheduling grants for the secondary devices, and a radio resource allocation for the secondary devices.

20 Claims, 8 Drawing Sheets

(51) Int. Cl.

| | |
|---|---|
| ***G06F 9/50*** | (2006.01) |
| ***H04W 12/06*** | (2021.01) |
| ***H04W 24/08*** | (2009.01) |
| ***H04W 28/26*** | (2009.01) |
| ***H04W 72/20*** | (2023.01) |

(52) U.S. Cl.

CPC .......... *H04W 24/08* (2013.01); *H04W 28/26* (2013.01); *H04W 72/20* (2023.01); *G06F 2209/5019* (2013.01); *G06F 2209/509* (2013.01)

(56) References Cited

U.S. PATENT DOCUMENTS

| | | | | |
|---|---|---|---|---|
| 10,585,718 | B2 * | 3/2020 | Sardino | G06F 9/5044 |
| 11,423,254 | B2 | 8/2022 | Prakash et al. | |
| 11,838,930 | B2 * | 12/2023 | Zhu | H04W 28/16 |
| 12,223,336 | B2 * | 2/2025 | Zhao | G06N 3/092 |
| 12,260,251 | B2 * | 3/2025 | Foukas | G06F 9/505 |
| 2006/0218551 | A1 * | 9/2006 | Berstis | G06F 9/4881<br>718/102 |
| 2012/0084781 | A1 * | 4/2012 | Isaka | G06F 9/5038<br>718/100 |
| 2014/0122558 | A1 * | 5/2014 | Azar | G06F 9/5094<br>709/201 |
| 2018/0103088 | A1 * | 4/2018 | Blainey | H04L 67/1008 |
| 2018/0183855 | A1 * | 6/2018 | Sabella | H04L 67/04 |
| 2018/0276048 | A1 * | 9/2018 | Liu | G06F 9/505 |
| 2019/0220703 | A1 | 7/2019 | Prakash et al. | |
| 2021/0007090 | A1 * | 1/2021 | Pan | H04L 5/0094 |
| 2021/0373947 | A1 * | 12/2021 | Kweon | G06F 9/4843 |
| 2022/0232423 | A1 * | 7/2022 | Thyagaturu | H04W 28/10 |
| 2022/0317692 | A1 * | 10/2022 | Guim Bernat | G05D 1/0217 |
| 2023/0032183 | A1 * | 2/2023 | Kang | H04L 67/1001 |
| 2023/0153124 | A1 * | 5/2023 | Zhao | G06F 9/4806<br>718/100 |
| 2023/0153305 | A1 * | 5/2023 | Caironi | G06F 16/2455<br>707/769 |

OTHER PUBLICATIONS

Elbamby et al.; "Wireless Edge Computing with Latency and Reliability Guarantees"; 2019 IEEE; (Elbamby_2019.pdf, pp. 1717-1737) (Year: 2019).*

Bozorgchenani et al.; "Centralized and Distributed Architectures for Energy and Delay Efficient Fog Network-Based Edge Computing Services;" 2018 IEEE; (Bozorgchenani_2018.pdf; pp. 250-263) (Year: 2018).*

Thang Le Duc et al., Machine Learning Methods for Reliable Resource Provisioning in Edge-Cloud Computing: A.Survey, ACM Computing Surveys, Sep. 13, 2019, pp. 94:1-94:39, vol. 52, No. 5, Article 94, Association for Computing Machinery, New York, NY, United States.

Islam Akhirul et al., A Survey on Task Offloading in Multi-access Edge Computing, Journal of Systems Architecture, Sep. 1, 2021, vol. 118, Elsevier.

Abbas Nadine et al., "Joint computing, communication and cost-aware task offloading in D2D-enabled Het-MEC", Computer Networks 209 (2022) 108900, Mar. 23, 2022, pp. 1-16, Elsevier.

Mehrabi Mahshid et al., "Mobility- and Energy-Aware Cooperative Edge Offloading for Dependent Computation Tasks", Network 2021, Sep. 4, 2021, pp. 191-214, MDPI.

Wu Jingyan et al., "Cooperative Offloading in D2D-Enabled Three-Tier MEC Networks for IoT", Wireless Communications and Mobile Computing, Aug. 16, 2021, pp. 1-13, Wiley.

Liu Xiangyan et al., "A novel D2D-MEC method for enhanced computation capability in cellular networks", Scientific Reports, Aug. 19, 2021, pp. 1-20, Springer Nature.

Mu Siqi et al., "Computation offloading to edge cloud and dynamically resource-sharing collaborators in Internet of Things", J Wireless Com Network (2020), Dec 2, 2020, pp. 1-21, SpringerOpen.

Xing Hong et al., "Joint Task Assignment and Resource Allocation for D2D-Enabled Mobile-Computing", IEEE Transactions on Communications, Jun. 2019, pp. 4193-4207, vol. 67, No. 6.

* cited by examiner

ELECTRONIC DEVICES WITH DELAY-BASED DISTRIBUTED COMPUTING

FIELD

This disclosure relates generally to wireless communications, including wireless communications performed by electronic devices.

BACKGROUND

Communications systems can include electronic devices with wireless communications capabilities. An electronic device can run software applications that perform various computational tasks. The computational tasks performed by software applications have become more workload-intensive over time. The electronic device might not have sufficient processing or power resources to perform the computational tasks within a relatively short amount of time. This can limit user experience and can limit the types of software applications used by the electronic device.

SUMMARY

A communications network may include electronic devices with wireless communication and computation capabilities. The electronic devices may include a primary (requesting) device and a set of one or more secondary (worker) devices. The primary device may run a software application. The software application may require the performance of a compute task that meets a corresponding performance target. The primary device may perform the compute task locally on its own or may distribute the compute task to the set of secondary devices. However, the set of secondary devices may be heterogenous in terms of compute capabilities and communication characteristics.

The primary device may receive and store statistics from the set of secondary devices over wireless communication links. The statistics may include statistical parameters associated with the compute capabilities and the communication characteristics of the secondary devices, as gathered and accumulated over time by the secondary devices. The secondary devices may transmit the statistics to the primary device periodically, as needed, on-demand, etc. The primary device may process the statistics to determine whether a given compute task will be offloaded to the secondary devices or performed locally.

The primary device may predict, based on the stored statistics, an expected performance gain in distributing the compute task to the secondary devices relative to performing the compute task locally. If the expected performance gain is high enough, the primary device may distribute shares of the compute task to the secondary devices in the set over the wireless communication links. The primary device may receive, collect, and decode compute results for the compute task from the set of secondary devices over the wireless communication links. If the expected performance gain is low enough, the primary device may perform the compute task locally. If the expected performance gain is moderate, the primary device may update the secondary devices included in the set of secondary devices and/or may update a coding and distribution scheme for the compute task.

The primary device may eliminate expected straggler devices from the set of secondary devices based on the statistics to further reduce runtime. The primary device may code redundancy into the shares of the compute task to mitigate stochastic straggler devices, colluder devices, and adversary devices. The primary device may update the stored statistics over time. The primary device may establish the set of secondary devices and request the corresponding statistics directly or via a trusted authentication server.

The primary device may generate an optimized distribution scheme for the set of secondary devices based on the statistics. For example, the primary device may identify first wireless delays from the statistics that are associated with transmission of signals from the primary device to the secondary devices. The primary device may identify second wireless delays from the statistics that are associated with transmission of compute results from the secondary devices to the primary device. The primary device may identify compute delays from the statistics that are associated with the processing resources of each of the secondary devices. The optimized distribution scheme may minimize the overall runtime of the compute operation given the first wireless delays, the second wireless delays, the compute delays, scheduling grants for the secondary devices, and a radio resource allocation for the secondary devices. The primary device may distribute the shares of the compute task to the secondary devices according to the optimized distribution scheme.

An aspect of the disclosure provides a wireless communication device. The electronic device can include one or more antennas configured to receive signals from a set of electronic devices remote from the wireless communication device. The electronic device can include one or more processors configured to use the one or more antennas to distribute respective shares of a compute task between the electronic devices in the set of electronic devices according to a distribution scheme, the distribution scheme being based on wireless delays and compute delays identified by the signals received from the set of electronic devices.

An aspect of the disclosure provides a method of operating a first electronic device. The method can include with one or more antennas, receiving a first signal from a second electronic device. The method can include with one or more processors, generating a first share of a compute task for the second electronic device based on a first wireless delay and a first compute delay identified from the first signal, the first wireless delay being associated with wireless transmission from the first electronic device to the second electronic device and the first compute delay being associated with processing resources on the second electronic device. The method can include with the one or more antennas, transmitting a first control signal to the second electronic device that instructs the second electronic device to perform the first share of the compute task. The method can include with the one or more antennas, receiving a first compute result for the first share of the compute task from the second electronic device.

An aspect of the disclosure provides a method of operating an wireless communication device. The method can include with one or more processors, using one or more antennas to distribute a first compute task among a set of electronic devices. The method can include with one or more antennas, receiving statistical parameters from the set of electronic devices. The method can include with the one or more processors, updating the set of electronic devices based on the statistical parameters received from the set of electronic devices. The method can include with the one or more processors, using the one or more antennas to distribute a second compute task among the updated set of electronic devices.

DETAILED DESCRIPTION

Figure 1:
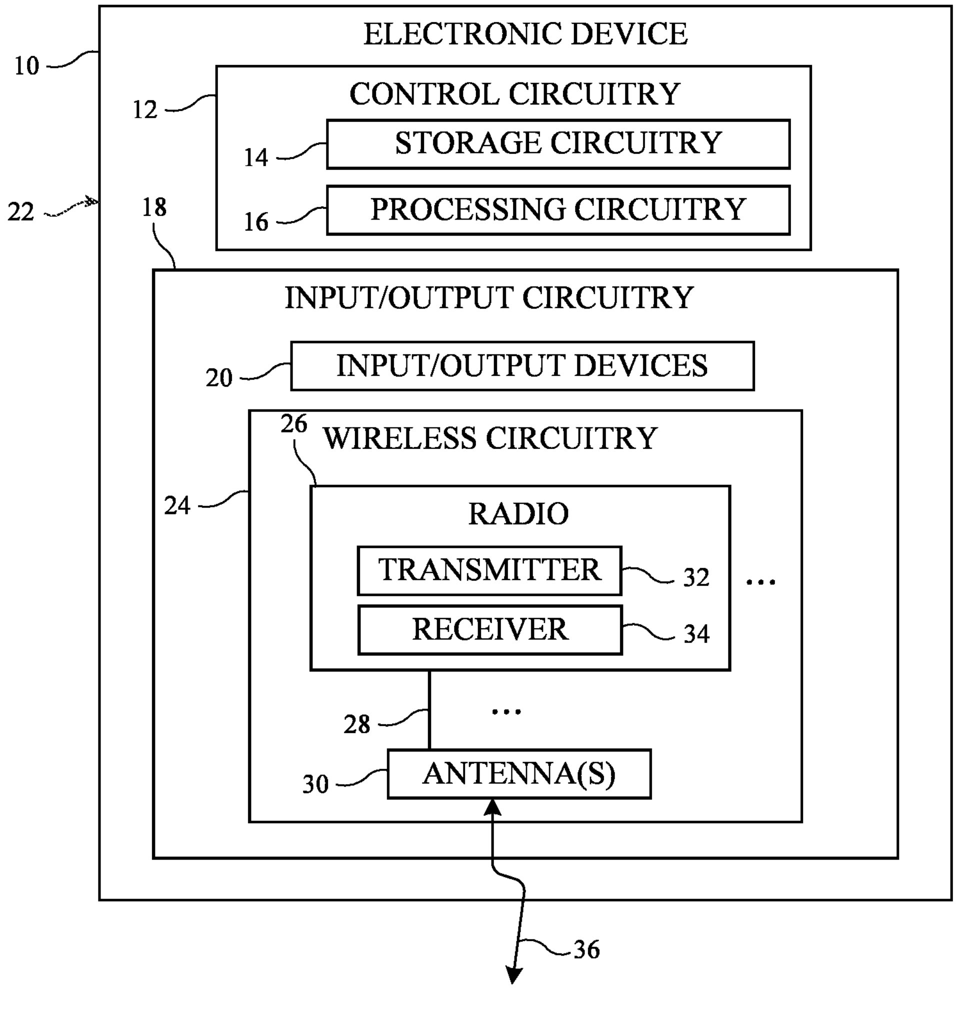
FIG. 1 is a schematic block diagram of an illustrative electronic device in accordance with some embodiments.

FIG. 1 is a block diagram of an illustrative electronic device 10. Device 10 may be a user equipment (UE) device that is owned and/or operated by a user and that wirelessly communicates with external communications equipment. The external communications equipment may include a wireless base station or access point or another UE device, as examples. Device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 1, device 10 may include components located on or within an electronic device housing such as housing 22. Housing 22, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 22 may be formed from dielectric or other low-conductivity material (e.g., glass, ceramic, plastic, sapphire, etc.). In other situations, housing 22 or at least some of the structures that make up housing 22 may be formed from metal elements.

Device 10 may include control circuitry 12. Control circuitry 12 may include storage such as storage circuitry 14. Storage circuitry 14 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 14 may include storage that is integrated within device 10 and/or removable storage media.

Control circuitry 12 may include processing circuitry such as processing circuitry 16. Processing circuitry 16 may be used to control the operation of device 10. Processing circuitry 16 may include on one or more processors such as microprocessors, microcontrollers, digital signal processors, host processors, baseband processor integrated circuits, application specific integrated circuits, central processing units (CPUs), graphics processing units (GPUs), etc. Control circuitry 12 may be configured to perform operations in device 10 using hardware (e.g., dedicated hardware or circuitry), firmware, and/or software. Software code for performing operations in device 10 may be stored on storage circuitry 14 (e.g., storage circuitry 14 may include non-transitory (tangible) computer readable storage media that stores the software code). The software code may sometimes be referred to as program instructions, software, data, instructions, or code. Software code stored on storage circuitry 14 may be executed by processing circuitry 16.

Control circuitry 12 may be used to run software on device 10 such as one or more software applications (apps). The applications may include satellite navigation applications, internet browsing applications, voice-over-internet-protocol (VOIP) telephone call applications, email applications, media playback applications, operating system functions, gaming applications, productivity applications, workplace applications, augmented reality (AR) applications, extended reality (XR) applications, virtual reality (VR) applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications.

To support interactions with external communications equipment, control circuitry 12 may be used in implementing communications protocols. Communications protocols that may be implemented using control circuitry 12 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol. Radio-frequency signals conveyed using a cellular telephone protocol may sometimes be referred to herein as cellular telephone signals.

Device 10 may include input-output circuitry 18. Input-output circuitry 18 may include input-output devices 20. Input-output devices 20 may be used to allow data to be supplied to device 10 and to allow data to be provided from device 10 to external devices. Input-output devices 20 may include user interface devices, data port devices, and other input-output components. For example, input-output devices 20 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, image sensors, light sensors, radar sensors, lidar sensors, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 20 may be peripherals that are coupled to a main processing unit or other portion of device 10 via a wired or wireless link).

Input-output circuitry 18 may include wireless circuitry 24 to support wireless communications. Wireless circuitry 24 (sometimes referred to herein as wireless communications circuitry 24) may include one or more antennas 30. Antennas 30 may transmit radio-frequency signals 36 to and/or may receive radio-frequency signals 36 from external communications equipment. Wireless circuitry 24 may also include one or more radios 26.

Radio 26 may include circuitry that operates on signals at baseband frequencies (e.g., baseband circuitry such as one or more baseband processors) and radio-frequency transceiver circuitry such as one or more radio-frequency transmitters 32 and one or more radio-frequency receivers 34. Transmitter 32 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 30. Receiver 34 may include demodulation circuitry, mixer circuitry for down-converting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 30. The components of radio 26 may be mounted onto a single substrate or integrated into a single integrated circuit, chip, package, or system-on-chip (SOC) or may be distributed between multiple substrates, integrated circuits, chips, packages, or SOCs.

Antenna(s) 30 may be formed using any desired antenna structures for conveying radio-frequency signals. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction (e.g., towards external communications equipment).

The term "convey radio-frequency signals" as used herein means the transmission and/or reception of the radio-frequency signals (e.g., for performing unidirectional and/or bidirectional wireless communications with external wireless communications equipment). Similarly, the term "convey wireless data" as used herein means the transmission and/or reception of wireless data using radio-frequency signals. Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Each radio 26 may be coupled to one or more antennas 30 over one or more radio-frequency transmission lines 28. Radio-frequency transmission lines 28 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 28 may be integrated into rigid and/or flexible printed circuit boards if desired. One or more radio-frequency lines 28 may be shared between multiple radios 26 if desired. Radio-frequency front end (RFFE) modules may be interposed on one or more radio-frequency transmission lines 28. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 28.

Radio 26 may transmit and/or receive radio-frequency signals 36 within corresponding frequency bands at radio frequencies (sometimes referred to herein as communications bands or simply as "bands"). The frequency bands handled by radio 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 24 may also be used to perform spatial ranging operations if desired.

The example of FIG. 1 is illustrative and non-limiting. While control circuitry 12 is shown separately from wireless circuitry 24 in the example of FIG. 1 for the sake of clarity, wireless circuitry 24 may include processing circuitry (e.g., one or more processors) that forms a part of processing circuitry 16 and/or storage circuitry that forms a part of storage circuitry 14 of control circuitry 12 (e.g., portions of control circuitry 12 may be implemented on wireless circuitry 24). As an example, control circuitry 12 may include baseband circuitry (e.g., one or more baseband processors), digital control circuitry, analog control circuitry, and/or other control circuitry that forms part of radio 26. The baseband circuitry may, for example, access a communication protocol stack on control circuitry 12 (e.g., storage circuitry 14) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer. If desired, the PHY layer operations may additionally or alternatively be performed by radio-frequency (RF) interface circuitry in wireless circuitry 24.

Figure 2:
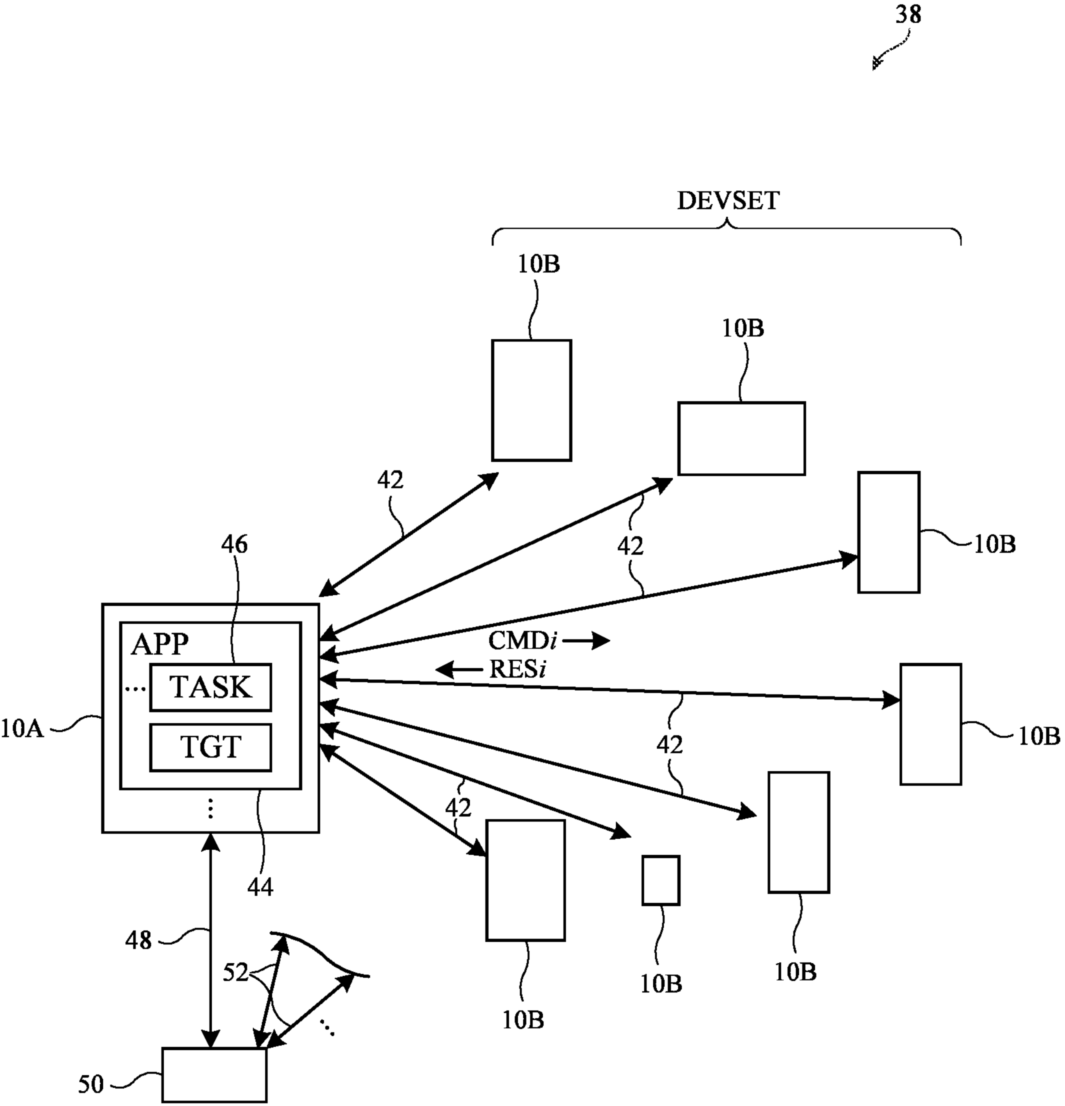
FIG. 2 is a diagram of an illustrative communications system having a primary device that distributes a computational workload to a set of secondary devices in accordance with some embodiments.

Device 10 may operate within a broader communications system that includes one or more other devices 10. FIG. 2 is a diagram showing one example of how multiple devices 10 may operate within a single communications system 38. Communications system 38 (sometimes referred to herein as communications network 38 or network 38) may include multiple network nodes. The network nodes may include communications terminals (e.g., end hosts) such as user equipment devices. The user equipment devices may include devices 10. The network nodes may also include communications equipment other than devices 10 such as one or more wireless base stations, wireless access points, switching devices, routers, relay devices, reflective devices, or other wireless equipment (not shown).

Communications system 38 may form a part of a larger communications network that includes network nodes coupled to devices 10 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc.

As shown in FIG. 2, communications system 38 may include a first device 10 such as device 10A. Communications system 38 may also include other devices 10 such as a set DEVSET of one or more devices 10B. Device 10A may run one or more software applications such as application (APP) 44 (e.g., at the AP layer of control circuitry 12 of FIG. 1). Application 44 may be any desired software application. During operation, application 44 may perform, execute, request, and/or require the performance or execution of one or more computational tasks such as compute task 46. Compute task 46 may be any desired computational or processing task, routine, function, algorithm, code, operation, query, process, or workload to be executed by one or more processors (e.g., in processing circuitry 16 of FIG. 1) in performing the operations of application 44 on device 10A. Compute task 46 may therefore sometimes also be referred to herein as a computational task, a processing task, a workload, a compute workload, a computational workload, a processing workload, a compute operation, a computational operation, a compute process, a computational process, a compute routine, a computational routine, a compute function, a computational function, an algorithm, a code, an operation, a query, a process, or simply as a task.

As one example, when application 44 is an image or video processing application, compute task 46 may be an image or video processing task that outputs a processed image or video based on an input image or video captured by one or more cameras on device 10A or received from another device. As another example, when application 44 is an AR, VR, or XR application, compute task 46 may be an image or video rendering or display task that produces or renders images or videos to be displayed by one or more displays on device 10A. As other examples, compute task 46 may be a machine learning or artificial intelligence task, a sensing task, a localization and mapping task, a spreadsheet processing task, a compiling task, or any other desired compute task for application 44.

In general, application 44 may have one or more compute targets TGT for the performance of compute task 46. Application 44 may require or may desire that compute task 46 be performed while meeting target TGT. Target TGT may, for example, include a target runtime required to complete compute task 46, a target power or battery consumption required to complete compute task 46, etc. If target TGT cannot be met, application 44 may not function properly or may exhibit unacceptably low levels of performance, thereby deteriorating user experience.

Device 10A may have a finite amount of resources with which to perform compute task 46. In some situations, device 10A may have insufficient resources to complete compute task 46 on its own or to complete compute task 46 while also meeting target TGT. Device 10A may therefore offload some or all of compute task 46 to one or more devices 10B from set DEVSET in communications system 38, in a process sometimes referred to as distributed computing (DC).

To perform distributed computing with devices 10B, information may be conveyed between device 10A and devices 10B over communications links such as inter-device communication links 42 (sometimes referred to herein as inter-device communication paths 42). There may be a respective inter-device communication link 42 between each device 10B and device 10A.

If desired, inter-device communication links 42 may be direct wireless communications links between device 10A and devices 10B (e.g., when devices 10B are in sufficiently close proximity to device 10A to support the transmission and reception of radio-frequency signals between devices 10B and device 10A). Radio-frequency signals may therefore be conveyed between device 10A and devices 10B to support the wireless communications links. The radio-frequency signals may include wireless local area network (WLAN) signals (e.g., Wi-Fi signals), Bluetooth (BT) signals, sidelink signals, device-to-device (D2D) signals (e.g., transmitted at relatively low frequencies such as frequencies in a frequency band below 1 GHz, below 2 GHz, below 3 GHz, below 950 MHz, or transmitted at higher frequencies), cellular telephone signals conveyed according to a cellular telephone protocol (e.g., a 5G protocol at frequencies below 100 GHz, a 6G protocol at frequencies around sub-THz/THz frequencies around 100-1000 GHz, etc.), or any other desired wireless signals.

Inter-device communication links 42 need not be direct wireless communications links. If desired, any of inter-device communication links 42 may include one or more intervening network nodes (not shown) such as wireless access points, wireless base stations, servers, switches, routers, relay devices, repeater devices, reflective devices, other devices 10, one or more networks or sub-networks, and any desired number of wireless and/or wired communications links that communicably couple device 10A to the corresponding device 10B via the one or more intervening network nodes (e.g., inter-device communication links 42 may be direct links, indirect links, links having any desired network topology).

Since device 10A has the compute task 46 to be offloaded to devices 10B in this example, device 10A may sometimes be referred to herein as primary device 10A or requesting device 10A. Devices 10B may sometimes be referred to herein as secondary devices 10B or worker devices 10B. Set DEVSET may sometimes be referred to herein as a set of secondary devices. If desired, communications system 38 may include a verification/authentication entity such as authentication server 50. Authentication server 50 may be coupled to primary device 10A over communications link 48 and may be coupled to secondary devices 10B over communications links 52. Communications links 48 and 52 may include any desired wireless and/or wired communications links and any desired number of intervening network nodes. Authentication server 50 may help to coordinate, verify, and/or authenticate communications between primary device 10A and secondary devices 10B over inter-device communication links 42 (e.g., in a manner that preserves the privacy and anonymity of each device to the other devices). While referred to herein as a server, authentication server 50 need not be a single server and may, in general, include any desired set of network nodes in communication system 38 (e.g., authentication server 50 may be implemented as a network of nodes/devices, as a network cloud region over a set of underlying physical devices, etc.).

To distribute compute task 46 to secondary devices 10B, primary device 10A may transmit control signals such as signals CMDi to secondary devices 10B over inter-device communication links 42. While sometimes referred to herein as control signals, the transmitted signals CMDi may include control and/or data, e.g., any information to define the compute task (e.g., a portion (share) of the compute task 46) to be performed by a device i in the corresponding secondary devices 10B in set DEVSET. Primary device 10A may assign different respective portions (shares) of compute task 46 to different secondary devices 10B in a process sometimes referred to herein as coding and distribution. Secondary devices 10B may perform the respective portions (shares) of compute task 46 as identified by signals CMDi and may generate corresponding compute results RESi. Secondary devices 10B may transmit compute results RESi to primary device 10A over inter-device communication links 42.

There may be, for example, N total secondary devices 10B in set DEVSET, each of which is labeled by a respective index i. Each secondary device 10B will therefore receive a different respective signal CMDi (e.g., from CMD1 to CMDN) over the corresponding inter-device communication link 42 and will transmit a different respective compute result RESi (e.g., from RES1 to RESN) over the corresponding inter-device communication link 42. N may be any desired integer greater than or equal to one. The size of set DEVSET (e.g., integer N) may change over time.

Primary device 10A may collect and aggregate the compute results RESi received from secondary devices 10B to produce an overall compute result for compute task 46. Application 44 may use the overall compute result to perform further processing operations, may output the overall compute result, may transmit the overall compute result to external equipment, or may perform any other desired operations based on the overall compute result. By distributing compute task 46 across secondary devices 10B, primary device 10A may leverage the processing power of secondary devices 10B to help minimize the time required to complete compute task 46 and to help complete compute task 46 while meeting target TGT.

In practice, secondary devices 10B are heterogenous in their wireless communications characteristics and in their computation capabilities. Some secondary devices 10B may have more processing power than other secondary devices 10B. For example, some secondary devices 10B may be relatively powerful devices such as laptop or desktop computers or relatively new devices whereas other secondary devices 10B may be less powerful devices such as wristwatches, tablet computers, cellular telephones, head-mounted devices, peripheral devices, or relatively old devices. At the same time, some secondary devices 10B may exhibit superior wireless performance in communicating over inter-device communication links 42 than other secondary devices 10B. For example, some secondary devices 10B may have superior radio-frequency hardware than other secondary devices 10B, some secondary devices 10B may be located relatively close to primary device 10A whereas other secondary devices 10B are located relatively far from primary device 10A, some secondary devices 10B may have a line-of-sight to primary device 10A whereas other secondary devices 10B are blocked by external objects, some secondary devices 10B may be using communications resources for other actions whereas other secondary devices 10B are otherwise idle, etc. As such, in some situations, distributing compute task 46 to secondary devices 10B may be slower than performing compute task 46 locally on primary device 10A, may consume more power/energy than performing compute task 46 locally on primary device 10A, and/or may otherwise not produce sufficient performance gain to merit the overhead required to distribute the compute task.

In other words, prior to distributing compute task 46, it is not always clear whether there will be a sufficient benefit to distribute compute task 46 for a specific set DEVSET of secondary devices 10B (e.g., given the compute and communication capabilities for the available secondary devices) and for a specific application 44 (e.g., as characterized by the ratio between compute load and communication load). The wireless links between primary device 10A and secondary devices 10B can also introduce significant delay to the completion of compute task 46, which is generally larger and more variable than when a wired link is used. The variability of the wireless links refers both to short term statistical variation as well as to the fact that the parameters characterizing the statistic distribution of the communication time may vary on a time scale comparable to or even shorter than the completion time of compute task 46.

As such, primary device 10A may distribute compute task 46 to secondary devices 10B only when distributing the compute task is likely to result in sufficient performance gain (e.g., a gain meeting or specified by target TGT) relative to only performing compute task 46 locally on primary device 10A (e.g., in terms of total compute time and/or energy consumption). Primary device 10A may, for example, include a distributed computing engine that decides whether or not to distribute compute task 46 based on the specific combination of the corresponding application 44, the set DEVSET of available secondary devices 10B (as well as their communications characteristics and compute capabilities), and target TGT at any given time.

These parameters may be regularly updated so the engine can continuously check and, if necessary, revise its decision over time.

Figure 3:
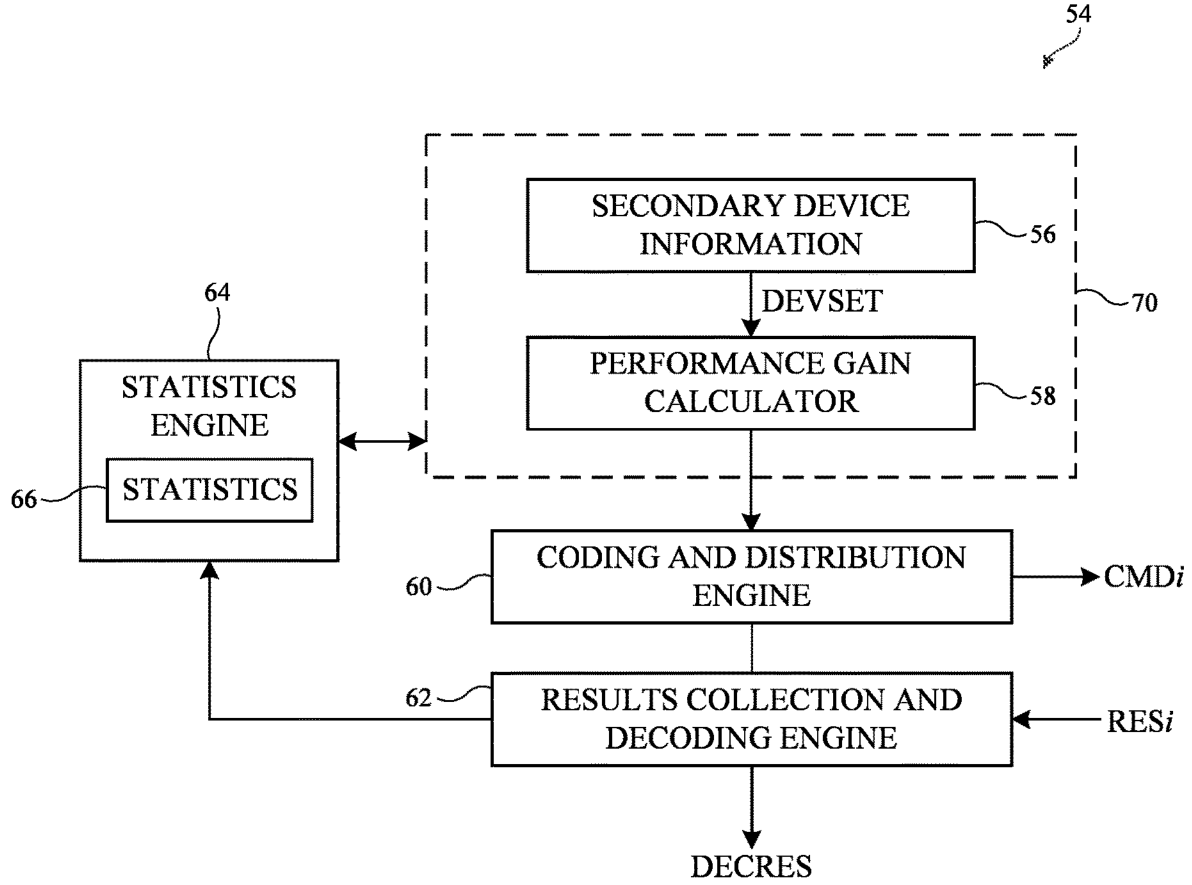
FIG. 3 is a block diagram of an illustrative distributed computing engine on a primary device that determines whether a computational workload will be performed on the primary device or distributed across a set of secondary devices in accordance with some embodiments.

FIG. 3 is a diagram of a distributed computing engine 54 on primary device 10A. The components of distributed computing engine 54 may be implemented using any desired combination of software (e.g., one or more applications) and/or hardware (e.g., digital circuitry, analog circuitry, logic gates, memory, registers, databases, signal processors, etc.). In some implementations that are described herein as an example, the components (blocks) of distributed computing engine 54 may be implemented using software (e.g., code) stored on storage circuitry 14 of FIG. 1 and the operations of the components (blocks) of distributed computing engine 54 may be executed or performed by processing circuitry 16 of FIG. 1 (e.g., at the AP layer).

As shown in FIG. 3, distributed computing engine 54 may include secondary device information 56, performance gain calculator 58, coding and distribution engine 60, results collection and decoding engine 62, and statistics engine 64. Secondary device information 56 and performance gain calculator 58 may sometimes be referred to herein collectively as planning/decision engine 70.

Secondary device information 56 may include information identifying the secondary devices 10B in set DEVSET (FIG. 2). Statistics engine 64 may include statistics 66. Statistics 66 and secondary device information 56 may be stored on storage, memory, in a database, and/or using any other desired data structure. Statistics 66 may include information (statistical parameters) associated with the wireless communications characteristics and the compute capabilities of the corresponding secondary devices 10B. Statistics 66 may be generated by secondary devices 10B and/or primary device 10A over time. Primary device 10A may receive some of the statistics from secondary devices 10B and may store the statistics for use in determining whether to distribute compute task 46.

Primary device 10A may update secondary device information 56 over time (e.g., as new secondary devices 10B become available or are added to set DEVSET, as secondary devices 10B become unavailable or are removed from set DEVSET, periodically, on demand, when the compute or communications characteristics of the secondary devices 10B change, after the results of one or more distribute compute tasks have been obtained, etc.). Statistics engine 64 may update statistics 66 over time (e.g., when updated statistics are received from secondary devices 10B, periodically, on demand, when the compute or communications characteristics of the secondary devices 10B change, after the results of one or more distribute compute tasks have been obtained, etc.).

Performance gain calculator 58 may identify the secondary devices 10B in set DEVSET based on secondary device information 56. Performance gain calculator 58 may receive or retrieve the statistics 66 for the secondary devices 10B in set DEVSET. Performance gain calculator 58 may process statistics 66 to determine/decide whether to distribute compute task 46. For example, performance gain calculator 58 may process statistics 66 to identify the expected performance gain from distributing compute task 46 to the secondary devices 10B in set DEVSET, to optimize the distribution and coding of compute task 46 among the secondary devices 10B in set DEVSET, and/or to determine whether the performance gain is high enough to merit distributing the compute task instead of performing the compute task locally on primary device 10A. If desired, performance gain calculator 58 may change the secondary devices 10B included in set DEVSET to generate an updated set DEVSET, may receive the statistics 66 from statistics engine 64 for the secondary devices 10B in the updated set DEVSET, and may process the statistics for the updated set DEVSET to determine whether to distribute compute task 46 among the secondary devices 10B in the updated set DEVSET.

When performance gain calculator 58 determines that the performance gain from distributing compute task 46 is sufficiently high relative to performing compute task 46 locally on primary device 10A, performance gain calculator 58 may control coding and distribution engine 60 to distribute compute task 46 among the set DEVSET of secondary devices 10B according to a selected coding and distribution scheme. Performance gain calculator 58 may select (generate) the coding and distribution scheme while identifying the expected performance gain, for example. The coding and distribution scheme may be selected (generated) based on a statistical model that convolves different statistical parameters to minimize the total compute time to perform the compute task using secondary devices 10B, in a manner that eliminates poor-performing devices, and/or in a manner that mitigates the presence of colluder or adversary devices. Coding and distribution engine 60 may generate a respective signal CMDi for transmission to each of the secondary devices 10B in set DEVSET according to the selected coding and distribution scheme. Signals CMDi may include the portion of compute task 46 to be performed by each secondary device 10B in set DEVSET. Transmitter 32 may use antenna(s) 30 (FIG. 1) to transmit signals CMDi to the secondary devices 10B in set DEVSET over inter-device communication links 42 (FIG. 2).

Receiver 34 may use antenna(s) 30 (FIG. 1) to receive compute results RESi from the secondary devices 10B in set DEVSET over inter-device communication links 42 (FIG. 2).

Results collection and decoding engine 62 may attempt to decode compute results RESi. If the results are decodable, results collection and decoding engine 62 may output a compute result DECRES of compute task 46. The corresponding application 44 may then perform subsequent operations based on compute result DECRES. If the results are not decodable, results collection and decoding engine 62 may, if desired, change the secondary devices 10B included in set DEVSET to generate an updated set DEVSET, allowing performance gain calculator 58 to re-determine whether to distribute compute task 46 among the secondary devices 10B in the updated set DEVSET. Results collection and decoding engine 62 may also provide information to statistics engine 64 to update statistics 66 for the set SETDEV of secondary devices 10B that generated the received results RESi.

Figure 4:
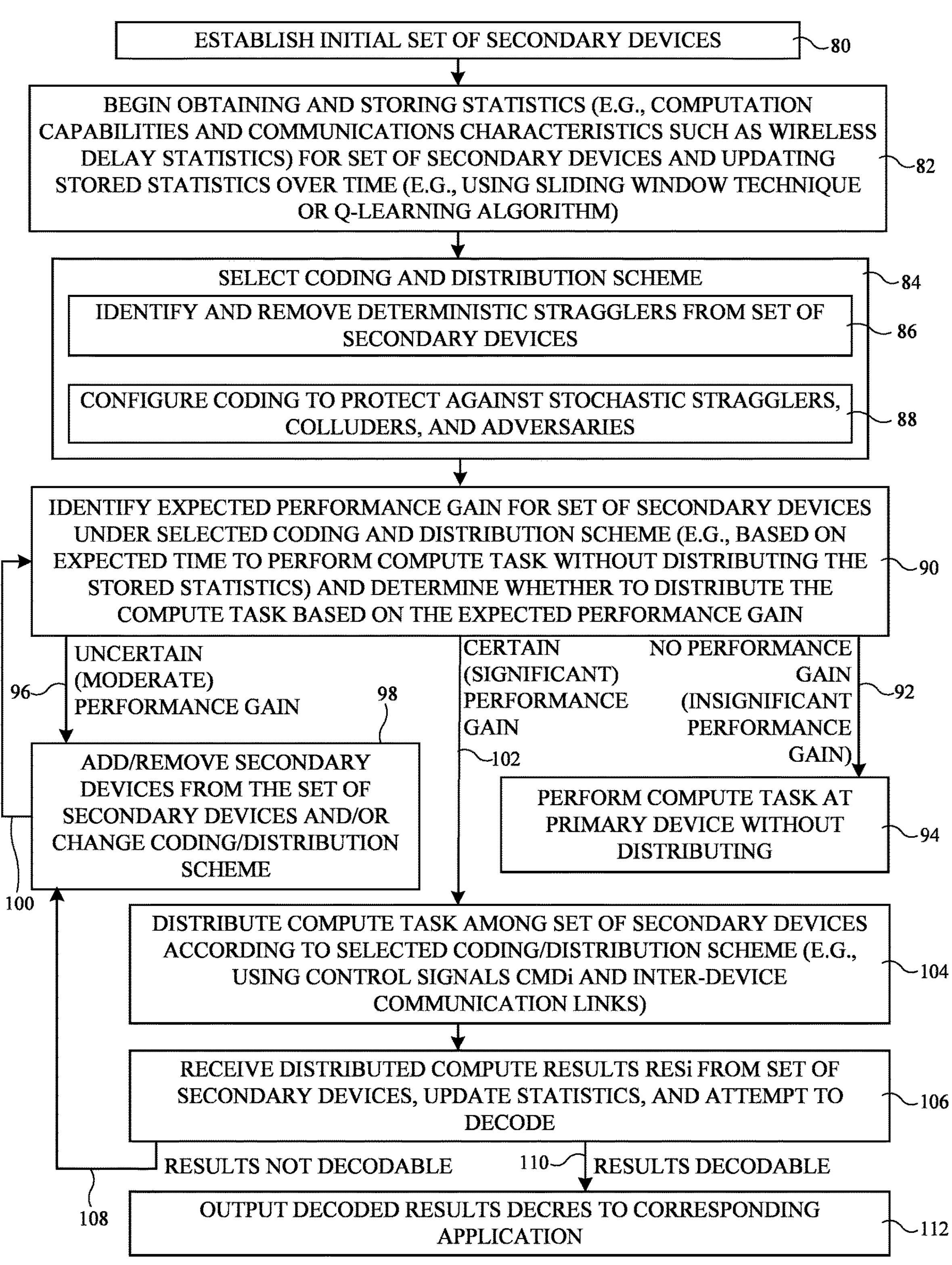
FIG. 4 is a flow chart of illustrative operations involved in using a primary device to optimally perform a computational workload locally or by distributing the computational workload to a set of secondary devices in accordance with some embodiments.

FIG. 4 is a flow chart of illustrative operations that may be performed by primary device 10A (e.g., one or more processors in control circuitry 12 of FIG. 1) to execute compute task 46 of FIG. 2. Primary device 10A may perform the operations of FIG. 4 to either execute compute task 46 locally on primary device 10A or to distribute compute task 46 among a set DEVSET of secondary devices 10B.

At operation 80, primary device 10A may establish an initial set DEVSET of secondary devices 10B. There may be N total secondary devices 10B in set DEVSET.

At operation 82, primary device 10A may begin obtaining and storing statistics 66 for each secondary device 10B in set DEVSET. The initial establishment of set DEVSET of secondary devices 10B may trigger the initialization of statistics 66 in statistics engine 64, for example. The statistics may be associated with the wireless communications characteristics and computation capabilities of each secondary device 10B in set DEVSET. Primary device 10A may receive the statistics generated by secondary devices 10B (e.g., over inter-device communication links 42 of FIG. 2) and may store the received statistics at statistics engine 64 of FIG. 3. Primary device 10A may pull or query the statistics from secondary devices 10B over the inter-device communication paths or authentication server 50 (FIG. 2) may instruct secondary devices 10B to transmit the statistics over the inter-device communication paths.

Primary device 10A and secondary devices 10B may also update their respective statistics over time (e.g., concurrent with one or more of the other operations shown in FIG. 4). Primary device 10A may receive the (updated) statistics of secondary devices 10B to update the stored statistics 66 periodically (e.g., with a configured periodicity) or in response to a trigger such as an increasing parameter variation. In addition, any updates to the set DEVSET of secondary devices 10B may trigger an update of statistics 66. Statistics engine 64 may keep track of and internally update the statistics 66 for each secondary device 10B for accurate compute distribution decisions. If desired, statistics engine 64 may update statistics 66 for secondary devices 10B using a sliding window technique. Additionally or alternatively, statistics engine 64 may update statistics 66 for secondary devices 10B using a Q-learning algorithm to permanently learn the wireless delay statistics (e.g., if a base station or access point is part of inter-device communication links 42 of FIG. 2).

At operation 84, primary device 10A may select (generate) a coding and distribution scheme for compute task 46. Primary device 10A may select (generate) the coding and distribution scheme based on the statistics 66 for the secondary devices 10B in set DEVSET.

The coding and distribution scheme may dictate how compute task 46 is divided up (e.g., apportioned or shared) between the secondary devices 10B in set DEVSET. The coding and distribution scheme may, for example, assign more of compute task 46 to secondary devices 10B having more computation capabilities (resources) and/or better wireless communications characteristics than to secondary devices 10B having fewer computation capabilities (resources) and/or worse wireless communications characteristics.

In selecting (generating) the coding and distribution scheme, primary device 10A may identify and remove deterministic (static) stragglers from the set DEVSET of secondary devices 10B (at operation 86). Deterministic (static) stragglers are secondary devices 10B that are on average, based on the statistics 66 generated by those secondary devices 10B and the corresponding statistics of the other secondary devices, expected to delay completion of compute task 46 by more than a threshold amount. Such stragglers may, for example, cause a total distributed compute duration TTOTAL to complete compute task 46 to be greater than if compute task 46 was not distributed at all or was distributed to a set of devices excluding the stragglers. By removing such stragglers from set DEVSET, primary device 10A can help to ensure that the performance gain in distributing compute task 46 is large enough to merit distributing the compute task instead of performing the compute task locally.

In selecting (generating) the coding and distribution scheme, primary device 10A may configure the coding scheme to protect against stochastic (non-deterministic) stragglers, colluder devices, and adversary devices (at operation 88). Stochastic (non-deterministic) stragglers are secondary devices 10B which, in a specific run, accidentally (or incidentally) delay the completion of the compute task, as the compute and/or communication time exceeds the expected value derived from the statistics associated with those secondary devices. Colluders are secondary devices 10B that pose a privacy threat to communication system 38. Adversaries are secondary devices 10B that pose a data integrity threat to the computation and the communication system 38. Primary device 10A can eliminate these types of secondary devices 10B from affecting the distributed compute task by appropriately coding how compute task 46 is distributed between the secondary devices. This may include introducing redundancy into the portions of compute task 46 performed by each secondary device 10B so that if one secondary device 10B does not perform its portion of the compute task, the other secondary devices may perform that portion instead. This represents a simple case and, in practice, more complex mathematical coding can be used to determine how compute task 46 is divided between secondary devices 10B. In general, any type of coding (e.g., Reed-Solomon coding, polynomial/algebraic coding, etc.) can be used to introduce parallelism and redundancy to how compute task 46 is divided between secondary devices 10B to protect against non-deterministic stragglers, colluder devices, and adversary devices.

At operation 90, primary device 10A (e.g., performance gain calculator 58 of FIG. 3) may identify an expected performance gain to be produced by the secondary devices 10B in set DEVSET by performing compute task 46 under the selected coding and distribution scheme, relative to the expected performance of primary device 10A in performing compute task 46 locally on its own. Primary device 10A may identify the expected performance gain based on the stored statistics 66 and based on the selected coding and distribution scheme. The performance gain may include a reduction in the total duration required to complete compute task 46 (sometimes referred to herein as distributed compute duration TTOTAL) and/or a reduction in energy consumption, for example.

Primary device 10A may determine whether to distribute compute task 46 to secondary devices 10B or whether to perform compute task 46 locally without distributing to secondary devices 10B based on the expected performance gain. If the expected performance gain is relatively high, this may be indicative of distributing compute task 46 meriting any additional overhead associated with distributing the task. On the other hand, if the expected performance gain is relatively low, this may be indicative of the distribution of compute task 46 not meriting the additional overhead.

If primary device 10A is certain that there will be no performance gain or the expected performance gain is less than a first threshold value (e.g., when distributed compute duration TTOTAL is greater than the time required for primary device 10A to perform compute task 46 on its own or is insufficiently less than the time required for primary device 10A to perform compute task 46 on its own), processing may proceed to operation 94 via path 92. At operation 94, primary device 10A may perform compute task 46 locally without distributing the compute task to secondary devices 10B, since distributing the task would not produce sufficient performance gain or could even reduce performance in executing the compute task.

If primary device 10A is certain that there will be performance gain or if the expected performance gain is greater than a second threshold value that is greater than or equal to the first threshold value (e.g., when distributed compute duration TTOTAL is less than the time required for primary device 10A to perform compute task 46 on its own or is sufficiently less than the time required for primary device 10A to perform compute task 46 on its own), processing may proceed from operation 90 to operation 104 via path 102.

At operation 104, primary device 10A (e.g., coding and distribution engine 60 of FIG. 3) may distribute compute task 46 among the secondary devices 10B in set DEVSET according to the selected coding and distribution scheme. Primary device 10A may, for example, transmit signals CMDi to secondary devices 10B over inter-device communication links 42 that instruct the secondary devices 10B to perform respective portions of compute task 46 as given by the selected coding and distribution scheme.

If primary device 10A is uncertain about whether there will be performance gain or if the expected performance gain is greater than the first threshold but less than the second threshold (e.g., there is only a moderate amount of expected performance gain), processing may proceed from operation 90 to operation 98 via path 96. At operation 98, primary device 10A may add or remove secondary devices 10B from set DEVSET (thereby producing an updated set DEVSET of secondary devices 10B) and/or may change the coding and distribution scheme for secondary devices 10B. Processing may then loop back to operation 90 via path 100 to determine whether the update to set DEVSET or the change in the coding and distribution scheme would result in a sufficiently high expected performance gain.

As an example, processing may proceed from operation 90 to operation 94 via path 92 when the following condition is true: $(E[TTOTAL]+/-\sigma_{DC})/(E[T_{SINGLE}]+/-\sigma_{SINGLE})>>1$, where E[TTOTAL] is the expectation value of the amount of time it will take the secondary devices 10B in set DEVSET to receive signals CMDi, to perform compute task 46, and to return compute results RESi under the selected coding and distribution scheme (e.g., the expectation value of total distributed compute duration TTOTAL), $\sigma_{DC}$ is the corresponding standard deviation, $E[T_{SINGLE}]$ is the expectation value of the amount of time it will take primary device 10A to perform compute task 46 locally on its own without distributing the compute task, and $\sigma_{SINGLE}$ is the corresponding standard deviation. In other words, when the expected total distributed compute duration TTOTAL is much larger than the expected time for primary device 10A to complete compute task 46 on its own, primary device 10A may forego distributing compute task 46 to optimize performance.

On the other hand, processing may proceed from operation 90 to operation 104 via path 102 when the following condition is true: $(E[TTOTAL]+/-\sigma_{DC})/(E[T_{SINGLE}]+/-\sigma_{SINGLE})<f_{SIGNIFICANCE}$, where $F_{SIGNIFICANCE}$ is a predetermined significance parameter that is less than or equal to one. For example, when $f_{SIGNIFICANCE}$ is equal to 0.9, compute task 46 will be distributed to secondary devices 10B when there is an expected performance gain of 90% or more by distributing compute task 46 rather than performing compute task 46 locally on primary device 10A.

Further, processing may proceed from operation 90 to operation 98 via path 96 when the following condition is true $(E[TTOTAL]+/-\sigma_{DC})/(E[T_{SINGLE}]+/-\sigma_{SINGLE})\sim<1$. In other words, if the expected total distributed compute duration TTOTAL is smaller but similar to the expected time for primary device 10A to complete compute task 46 on its own (or similar and not significantly greater than the expected time for primary device 10A to complete compute task 46 on its own), primary device 10A may try changing the secondary devices 10B that are included in set DEVSET and/or changing the coding and distribution scheme to see if a larger expected performance gain would result.

At operation 106, primary device 10A may receive compute results RESi from the secondary devices 10B in set DEVSET over inter-device communication links 42. Primary device 10A (e.g., results collection and decoding engine 62 of FIG. 3) may attempt to decode the received compute results RESi. When the received compute results RESi are not decodable, processing may loop back to operation 98 via path 108 to check whether an updated set DEVSET or an updated coding and distribution scheme would result in decodable compute results. Primary device 10A may be unable to decode the compute results when there are a relatively high number of non-deterministic stragglers in the secondary devices 10B of set DEVSET. Primary device 10A may also update its stored statistics 66 for the secondary devices 10B in set DEVSET based on the received compute results RESi, thereby helping to ensure that primary device 10A has up-to-date statistical parameters for secondary devices 10B.

When the received compute results RESi are decodable, processing may proceed from operation 106 to operation 112 via path 110. At operation 112, primary device 10A may output the decoded compute results of compute task 46 (e.g., compute result DECRES of FIG. 3) to application 44 for subsequent processing. In this way, primary device 10A may produce the results of compute task 46 for application 44 with a substantial performance gain (e.g., a lower total run time and/or reduced power consumption) relative to performing compute task 46 locally. At the same time, primary device 10A may dynamically assess the current compute and communications conditions of the available secondary devices 10B to ensure that the compute task is not distributed to secondary devices 10B when the statistics 66 generated by secondary devices 10B indicate that doing so would exhibit insufficient performance gain relative to performing compute task 46 locally. This may allow primary device 10A to perform compute task 46 for application 44 in a dynamic manner that minimizes runtime and/or power consumption over time by leveraging the processing power of secondary devices 10B when useful.

To identify the expected performance gain (e.g., while processing operation 90 of FIG. 4), primary device 10A may model time delays associated with offloading compute task 46 to secondary devices 10B. For each secondary device 10B in set DEVSET, primary device 10A may convolve or consider three different delays: a data reception delay TRXi characterizing the time required for the $i^{th}$ secondary device 10B to receive its signal CMDi from primary device 10A (e.g., a first wireless delay), a computation delay TCMPi characterizing the time required for the $i^{th}$ secondary device 10B to perform its portion of compute task 46 as assigned by the corresponding signal CMDi (e.g., a compute delay), and a data transmission delay TTXi characterizing the time required for the $i^{th}$ secondary device 10B to transmit its signal CMDi to primary device 10A (e.g., a second wireless delay).

Primary device 10A may identify these delays based at least in part on the stored statistics 66 (FIG. 3). Data reception delay TRXi and data transmission delay TTXi may depend on scheduling grants for secondary devices 10B provided by primary device 10A or by base stations or access points (e.g., in situations where inter-device communication links 42 include base stations or access points), as well as the radio resource allocation in the downlink (DL) direction and the uplink (UL) direction. The DL direction may be from primary device 10A to secondary devices 10B. The UL direction may be from secondary devices 10B to primary device 10A. In general, this model may cover any desired radio resource distribution such as a "per distribution iteration static" Frequency Division Multiple Access (FDMA) scheme, a full duplex division multiple access scheme, a Time Division Multiple Access (TDMA) scheme, or any desired hybrids of these schemes.

Figure 5:
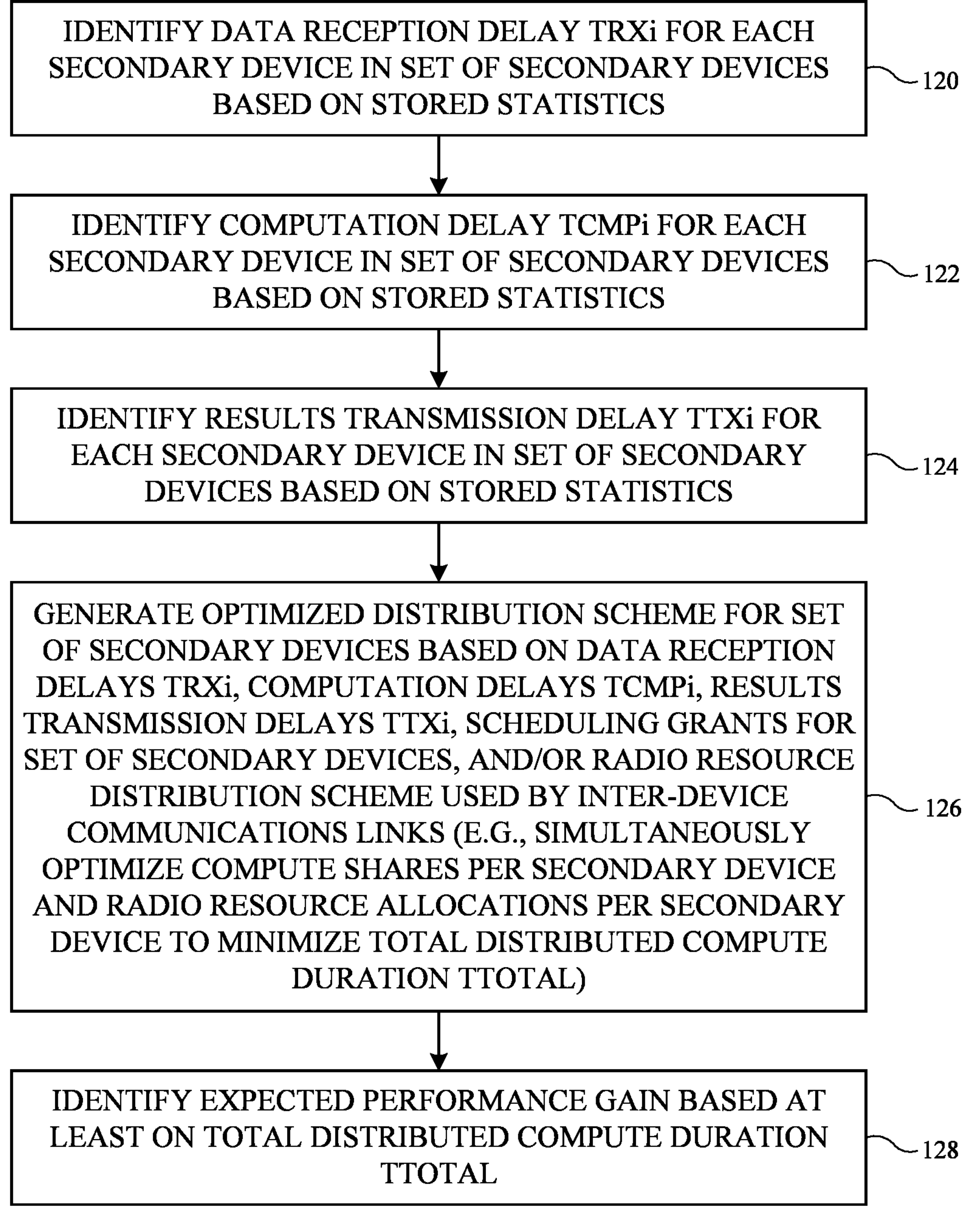
FIG. 5 is a flow chart of illustrative operations involved in using a primary device to distribute a computational workload across a set of secondary devices based on wireless and computation delay statistics associated with the set of secondary devices in accordance with some embodiments.

FIG. 5 is a flow chart of illustrative operations that may be performed by primary device 10A to distribute compute task 46 across set DEVSET of secondary devices 10B based on statistics 66. The operations of FIG. 5 may, for example, be performed while processing operations 84 and 90 of FIG. 4.

At operation 120, primary device 10A (e.g., performance gain calculator 58 of FIG. 3) may identify a respective data reception delay TRXi for each secondary device 10B in set DEVSET based on the stored statistics 66. Data reception delays TRXi may sometimes be referred to herein as data reception times TRXi, data reception durations TRXi, data reception delay times TRXi, or data reception delay durations TRXi.

At operation 122, primary device 10A (e.g., performance gain calculator 58 of FIG. 3) may identify a respective computation delay TCMPi for each secondary device 10B in set DEVSET based on the stored statistics 66. Computation delays TCMPi may sometimes be referred to herein as computation delay times TCMPi, computation delay durations TCMPi, computation delay times TCMPi, or computation delay durations TCMPi.

At operation 124, primary device 10A (e.g., performance gain calculator 58 of FIG. 3) may identify a respective data transmission delay TTXi for each secondary device 10B in set DEVSET based on the stored statistics 66. Data transmission delays TTXi may sometimes be referred to herein as data transmission times TTXi, data transmission durations TTXi, data transmission delay times TTXi, or data transmission delay durations TTXi. Data reception delays TRXi and data transmission delays TTXi are wireless delays associated with the propagation of radio-frequency signals along physical or logical inter-device communication links 42. Computation delays TCMPi is associated with the time required for the secondary devices 10B to perform their respective assigned portions of compute task 46.

At operation 126, primary device 10A (e.g., performance gain calculator 58 of FIG. 3) may generate an optimized distribution scheme for compute task 46 among the set DEVSET of secondary devices 10B. Primary device 10A may generate the optimized distribution scheme using a delay model that accounts for the data reception delays TRXi, the data transmission delays TTXi, and the computation delays TCMPi, the scheduling grants for the set DEVSET of secondary devices 10B, and/or the radio resource distribution scheme implemented by inter-device communication links 42. The delay model may simultaneously optimize compute shares (e.g., portions of compute task 46) per device and the radio resource allocations per device on a "per distribution iteration static" FDMA scheme, as one example. This optimization may serve to minimize the total distributed compute duration TTOTAL required to distribute and perform compute task 46 (e.g., the overall run time equal to the sum of the time required to distribute the data in signals CMDi, the time required by secondary devices 10B to compute their shares of compute task 46, and the time required for secondary devices 10B to return their compute results RESi to primary device 10A).

At operation 128, primary device 10A (e.g., performance gain calculator 58 of FIG. 3) may identify the expected performance gain based at least on the total distributed compute duration TTOTAL. Primary device 10A may then process the expected performance gain to determine whether to distribute compute task 46 or to perform compute task 46 locally (e.g., while processing operation 90 of FIG. 4).

Figure 6:
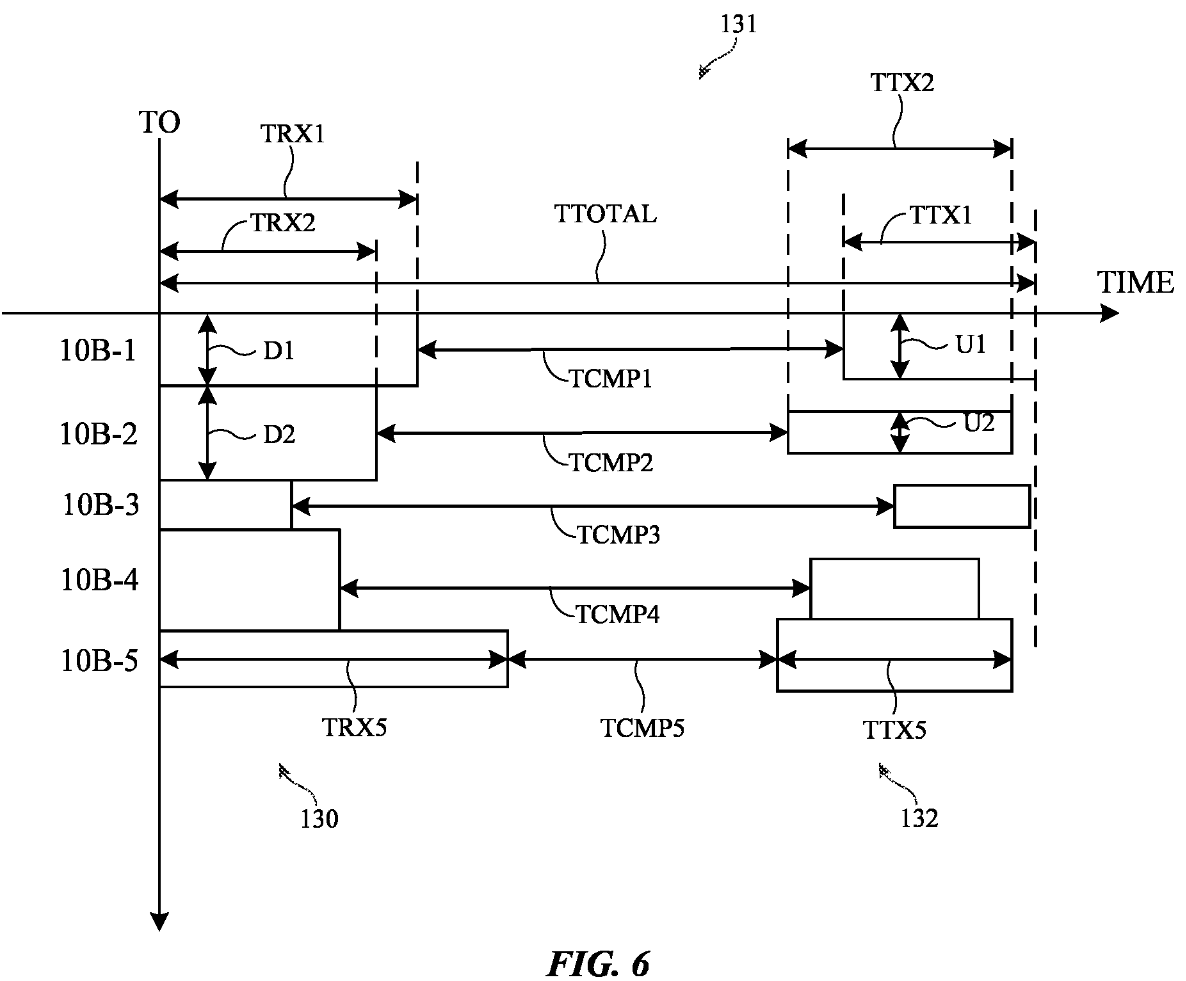
FIG. 6 is a timing diagram showing how an illustrative primary device may distribute a computational workload across a set of secondary devices based on wireless and computation delay statistics associated with the set of secondary devices in accordance with some embodiments.

FIG. 6 is a timing diagram showing one example of an optimized distribution scheme (model) 131 that primary device 10A may generate for a set DEVSET of five secondary devices 10B (e.g., secondary devices 10B-1, 10B-2, 10B-3, 10B-4, and 10B-5) to perform a given compute task 46. Optimized distribution scheme 131 simultaneously optimizes compute shares and radio resource allocations in a manner that minimizes total distributed compute duration TTOTAL and therefore maximizes the expected performance gain. Primary device 10A may generate optimized distribution scheme 131 based on statistics 66 while processing operation 126 of FIG. 5, for example.

Time is plotted on the horizontal axis of FIG. 6. Each row of optimized distribution scheme 131 illustrates the timing of a respective one of secondary devices 10B in receiving the corresponding signal CMDi, performing its assigned portion (share) of compute task 46, and in transmitting the corresponding compute result RESi. The vertical axis may plot frequency across a corresponding channel bandwidth (e.g., in a per distribution iteration static FDMA scheme).

Blocks 130 of FIG. 6 illustrate the modeled reception of signals CMDi by secondary devices 10B (beginning at an initial time T0). The length of each block 130 represents the data reception delay TRXi for the corresponding secondary device 10B (e.g., as given by statistics 66 and as identified by primary device 10A while processing operation 120 of FIG. 5). For example, secondary device 10B-1 may have a data reception delay TRX1, secondary device 10B-2 may have a data reception delay TRX2 that is less than data reception delay TRX1, secondary device 10B-5 may have a data reception delay TRX5 that is longer than data reception delay TRX1, etc. This may, for example, be indicative of secondary device 10B-5 having longer/slower wireless delay statistics in statistics 66 than secondary device 10B-1, which has longer/slower wireless delay statistics in statistics 66 than secondary device 10B-2. The thickness D of blocks 130 may be indicative of the DL channel bandwidth with which primary device 10A transmits signals CMDi to secondary devices 10B over inter-device communication links 42. Optimized distribution scheme 131 may, for example, assign different downlink bandwidths to different secondary devices 10B (e.g., a first DL bandwidth D1 to secondary device 10B-1, a second DL bandwidth D2 to secondary device 10B-2, etc.).

Primary device 10A may model each secondary device 10B as performing its respective portion of compute task 46 during a corresponding computation delay TCMPi beginning at the end of blocks 130 (e.g., secondary device 10B-1 may have computation delay TCMP1, secondary device 10B-2 may have computation delay TCMP2, etc.). The length of each computation delay TCMPi represents the amount of time expected to be required by each secondary device 10B to perform its portion (share) of the compute task given its current computation capabilities (e.g., as modeled based on statistics 66). Secondary devices 10B that are provided with larger portions of compute task 46 or that have slower computation capabilities may, for example, be assigned or modeled a longer computation delay TCMPi.

Blocks 132 of FIG. 6 illustrate the modeled transmission of compute results RESi by secondary devices 10B after completion of the corresponding computation delays TCMPi. The length of each block 132 represents the data transmission delay TTXi for the corresponding secondary device 10B (e.g., as given by statistics 66 and as identified by primary device 10A while processing operation 120 of FIG. 5). For example, secondary device 10B-1 may have a data transmission delay TTX1, secondary device 10B-2 may have a data transmission delay TTX2, secondary device 10B-5 may have a data transmission delay TTX5, etc. The thickness U of blocks 132 may be indicative of the UL channel bandwidth with which secondary devices 10B transmit compute results RESi to primary device 10A over inter-device communication links 42.

Optimized distribution scheme 131 may, for example, assign different uplink bandwidths to different secondary devices 10B (e.g., a first UL bandwidth U1 to secondary device 10B-1, a second UL bandwidth U2 to secondary device 10B-2, etc.).

The secondary device 10B having the longest total sum of data reception delay TRXi, computation delay TCMPi, and data transmission delay TTXi may determine the total distributed compute duration TTOTAL. In the example of FIG. 6, secondary device 10B-1 is modeled as taking the longest amount of time to receive its signal CMDi, to perform its portion of compute task 46, and to transmit its compute result RESi. As such, total distributed compute duration TTOTAL is defined as the time period from initial time T0 to the end of the block 132 of secondary device 10B-1. Compute task 46 is thus modeled to be completed within total distributed compute duration TTOTAL even though it is distributed among five secondary devices 10B.

Primary device 10A may generate optimized distribution scheme 131 in a manner that minimizes distributed compute duration TTOTAL given the scheduled radio resources of each of the secondary devices 10B in set DEVSET and the wireless communications characteristics and communications capabilities of each of the secondary devices 10B in set DEVSET (e.g., the data transmission delays TTXi, data reception delays TRXi, and computation delays TCMPi as identified based on statistics 66). Such an optimized distribution ensures that distributed compute duration TTOTAL is as small as possible given the current operating conditions and the current capabilities of the available secondary devices 10B.

Primary device 10A may then process the distributed compute duration TTOTAL given by optimized distribution scheme 131 to determine whether there is sufficient expected performance gain from distributing compute task 46 (e.g., by comparing distributed compute duration TTOTAL to the time expected for primary device 10A to complete compute task 46 on its own while processing operation 90 of FIG. 4). If distributed compute duration TTOTAL is too long, primary device 10A may forego distributing compute task 46 and may perform compute task 46 locally (e.g., operation 94 of FIG. 4). If distributed compute duration TTOTAL is not short enough, primary device 10A may adjust distribution scheme 131, the corresponding coding scheme, and/or which secondary devices 10B are included in set DEVSET to try to further reduce compute duration TTOTAL (e.g., operation 98 of FIG. 4).

If distributed compute duration TTOTAL is sufficiently short, primary device 10A may distribute shares (portions) of compute task 46 between the secondary devices 10B in set DEVSET (e.g., secondary devices 10B-1 through 10B-5) according to optimized distribution scheme 131. Primary device 10A may transmit signals CMDi to the secondary devices 10B in set DEVSET that instruct the secondary devices 10B to perform their respective shares (portions) of compute task 46 (e.g., while processing operation 104 of FIG. 4). Primary device 10A may receive compute results RESi from secondary devices 10B and may decode the compute results to output decoded results DECRES (FIG. 3). The example of FIG. 6 is illustrative and non-limiting and, in general, any desired optimized distribution scheme may be used to distribute compute task 46 between any number of secondary devices 10B in set DEVSET.

Figure 7:
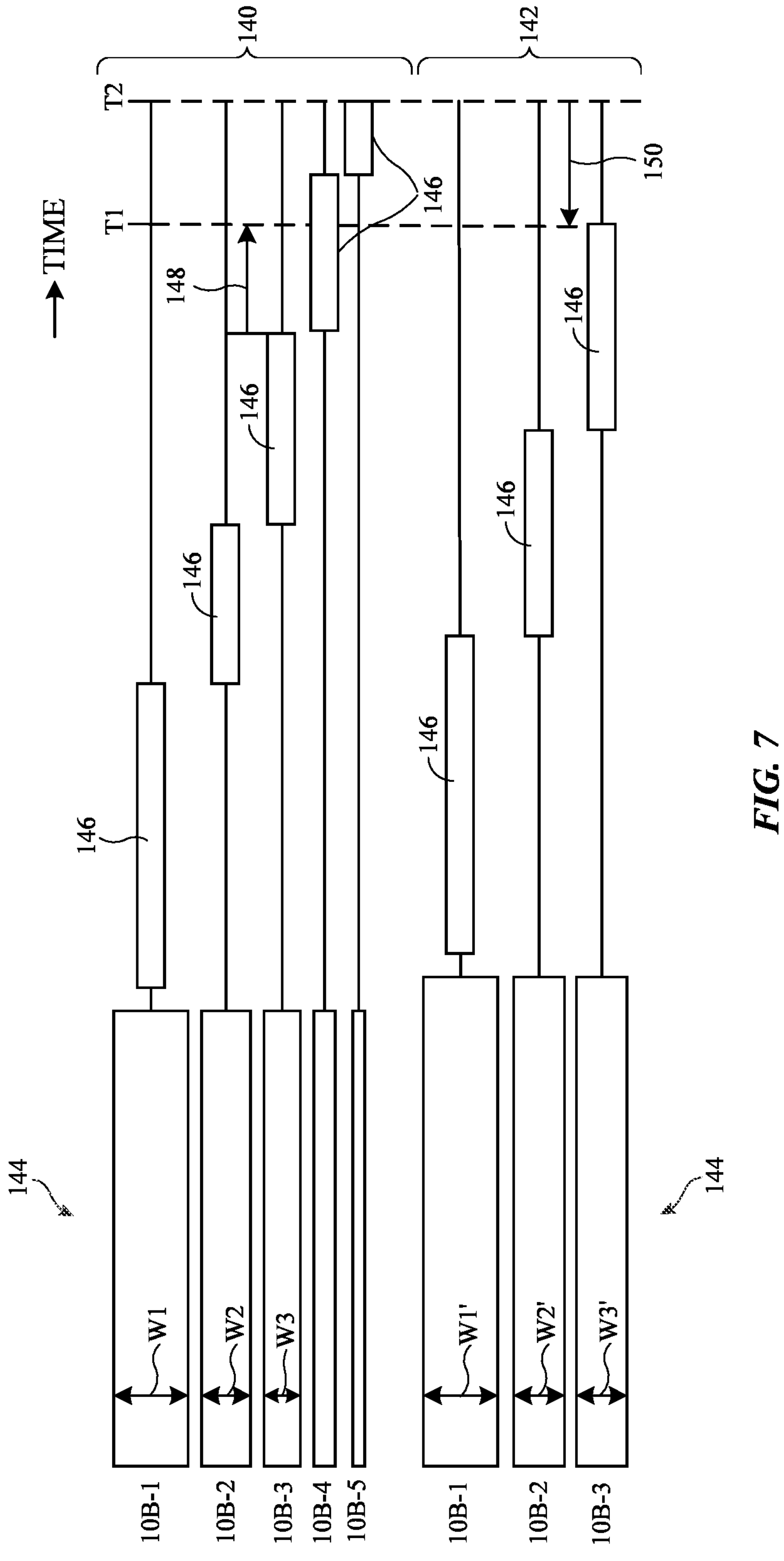
FIG. 7 is a timing diagram showing how the duration of a computational workload distributed across a set of secondary devices may be minimized by removing deterministic stragglers from the set of secondary devices in accordance with some embodiments.

Primary device 10A may prune the set DEVSET of secondary devices 10B to remove deterministic (expected) stragglers prior to transmitting signals CMDi to secondary devices 10B (e.g., at operation 86 of FIG. 4). Such pruning may be performed in a way that reduces coding overhead and/or that further reduces overall runtime in completing the compute task. FIG. 7 shows one example of how removing deterministic stragglers from set DEVSET may further reduce overall runtime in completing compute task 46.

Timing diagram 140 of FIG. 7 illustrates the operation of secondary devices 10B in a scenario where set DEVSET includes five secondary devices 10B-1, 10B-2, 10B-3, 10B-4, and 10B-5. Blocks 144 illustrate the compute operations performed by the secondary devices in processing their respective shares of compute task 46. The width W of blocks 144 illustrate the size of the workload of each secondary device in performing its share of compute task 46. For example, secondary device 10B-1 may have a workload W1, secondary device 10B-2 may have a workload W2, secondary device 10B-3 may have a workload W3, etc.

Blocks 146 illustrate the communication operations of secondary devices 10B in transmitting compute results RESi to primary device 10A. Secondary devices 10B may complete transmission of compute results RESi by time T2. In the example of FIG. 7, secondary devices 10B-4 and 10B-5 are deterministic (expected) stragglers that undesirably limit the speed with which set DEVSET performs compute task 46. Primary device 10A may identify that secondary devices 10B-4 and 10B-5 are deterministic stragglers based on statistics 66 (e.g., while processing operation 86 of FIG. 4). Primary device 10A may therefore remove secondary devices 10B-4 and 10B-5 from set DEVSET prior to identifying the expected performance gain for set DEVSET.

Timing diagram 142 of FIG. 7 illustrates the operation of secondary devices when the deterministic stragglers (secondary devices 10B-4 and 10B-5) have been removed from set DEVSET. Primary device 10A may redistribute the workload that would have been performed by secondary devices 10B-4 and 10B-5 to secondary devices 10B-1, 10B-2, and 10B-3. This may configure secondary devices 10B-1, 10B-2, and 10B-3 to have workloads W1', W2', and W3', which may be greater than workloads W1, W2, and W3 of timing diagram 140. Secondary devices 10B-1, 10B-2, and 10B-3 may complete transmission of compute results RESi by time T1. This may be later than the transmission of compute results RESi by secondary devices 10B-1, 10B-2, and 10B-3 without pruning secondary devices 10B-4 and 10B-5 by margin 148.

However, time T1 may still be significantly earlier than time T2 (e.g., by margin 150). In other words, excluding secondary devices 10B-4 and 10B-5 may be beneficial to the overall runtime of set DEVSET in performing compute task 46. Primary device 10A may thereby pre-emptively eliminate expected straggler devices from set DEVSET to further minimize the compute duration TTOTAL with which compute task 46 is performed.

Figure 8:
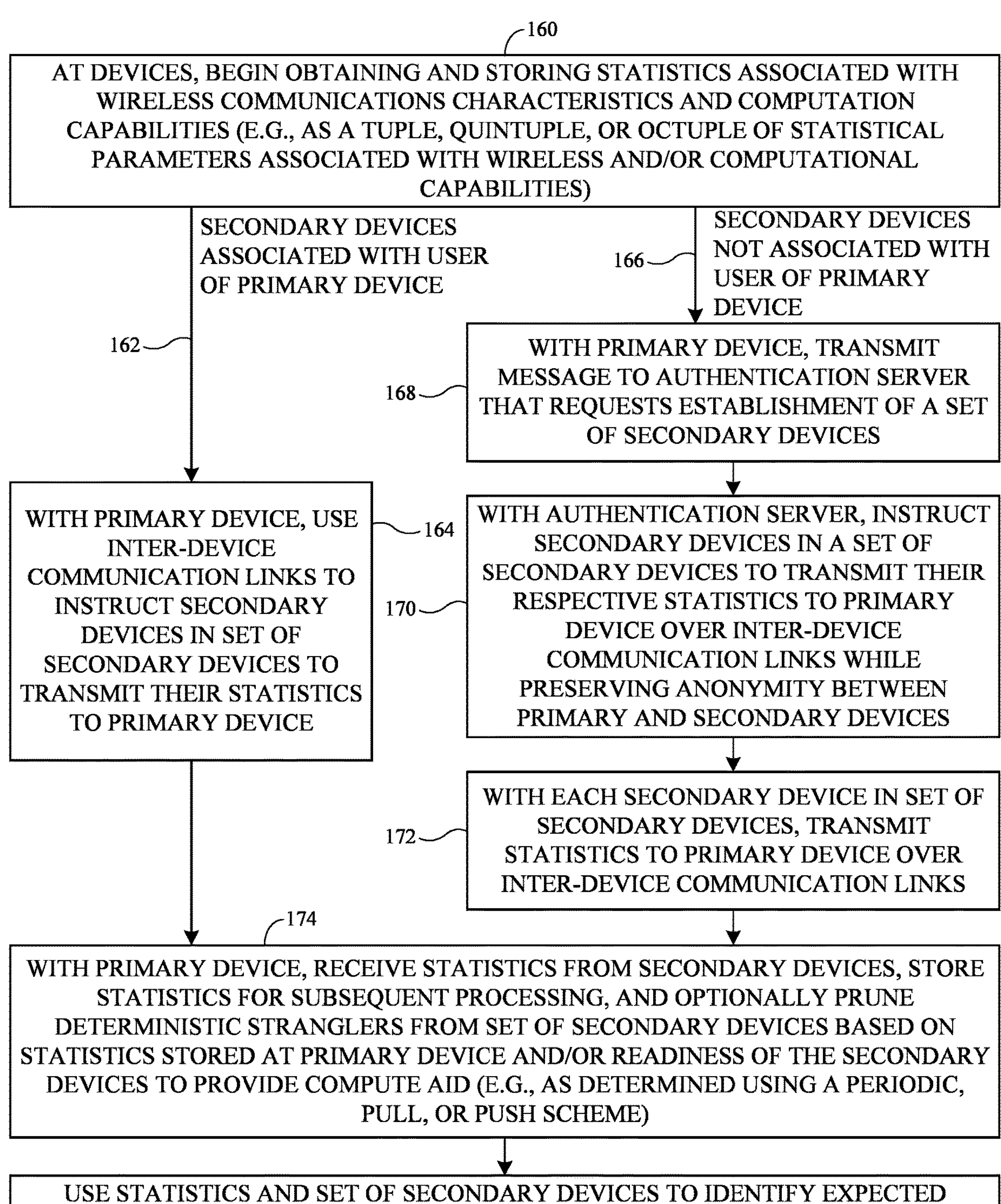
FIG. 8 is a flow chart of illustrative operations involved in providing wireless and computation delay statistics associated with a set of secondary devices to a primary device for determining when and how to distribute a computational workload across the set of secondary devices in accordance with some embodiments.

In some situations, secondary devices 10B may be owned, operated, and/or otherwise known to primary device 10A or the user of primary device 10A. In other situations, one or more secondary devices 10B may be owned or operated by other users. FIG. 8 is a flow chart of illustrative operations that may be performed by communication system 38 (FIG. 3) to establish and update the set DEVSET of secondary devices 10B while maintaining privacy in situations where one or more primary device 10A and secondary devices 10B are owned or operated by different users. Statistics (e.g., for storage in statistics 66 on primary device 10A of FIG. 3) may be conveyed from the established set DEVSET of secondary devices 10B to primary device 10A for use in determining when to distribute compute task 46.

At operation 160, primary device 10A and secondary devices 10B may begin to obtain (e.g., generate, produce, collect, store, etc.) statistics associated with their respective wireless communications characteristics and computation capabilities (e.g., while processing operation 82 of FIG. 4). Primary device 10A may store its statistics on statistics 66 of FIG. 3. Primary device 10A may receive the statistics generated by secondary devices 10B and may store the received statistics on statistics 66 of FIG. 3. Primary device 10A and secondary devices 10B may update the statistics over time (e.g., concurrent with one or more of the other operations shown in FIG. 8). Primary device 10A may receive the statistics of secondary devices 10B periodically, on demand (e.g., in a pull request or via push from secondary devices 10B), when new secondary devices 10B are available, when operating conditions of secondary devices 10B change, etc.

The statistics generated by each device 10 (e.g., primary device 10A or a secondary devices 10B) may include one or more statistical parameters characterizing the wireless communications characteristics and/or the compute capabilities of that device 10 (e.g., an indication of a capability of the device). The statistical parameters for a given device may include a tuple (e.g., a quintuple or octuple) of statistical parameters, if desired. The statistical parameters may include distributions characterizing the probability that it will take different times to complete the compute task. For example, the statistical parameters may include a tuple that includes a rate parameter $\mu_i$ and a location parameter $a_i$ describing a shifted exponential distribution of times the $i^{th}$ secondary device 10B will take to complete a compute task. As another example, the statistical parameters may include a quintuple that includes separate rate and location parameters for the shifted exponential distribution of times to perform a compute task and the shifted exponential distribution of times to convey wireless signals between the primary device and the secondary device, as well as the average bandwidth allocation. As yet another example, the statistical parameters may include an octuple that includes separate rate and location parameters for the shifted exponential distribution of times to perform a compute task, the shifted exponential distribution of times to transmit signals CMDi to the secondary device, the shifted exponential distribution of times to transmit compute results RESi to the primary device, the average uplink and downlink bandwidths, and the uplink to downlink ratio. These distributions and statistical parameters are illustrative and in general the statistics may include any desired statistical parameters characterizing the wireless link, channel conditions, or wireless propagation (e.g., wireless delays) between primary device 10A and secondary devices 10B and characterizing the compute time of secondary devices 10B. The exponential distribution is exemplary. Any suitable distribution, that fits the wireless communication delay samples and/or the compute delay samples well, can be used. As an example, the distribution may be any of a Weibull distribution, Gaussian distribution, or Erlang distribution in shifted or non-shifted form. For a shifted Weibull distribution, the statistical parameters may include a tuple that includes a shape parameter $k_i$, a scale parameter $\lambda_i$ and a location parameter $a_i$. For a Gaussian distribution, the statistical parameters may include a tuple that includes an expectation value $\mu_i$ and standard deviation $\sigma_i$. For a shifted Erlang distribution, the statistical parameters may include a tuple that includes a shape parameter $k_i$, a rate parameter $\lambda_i$ and a location parameter $a_i$. As further examples, different types of distributions (e.g., shifted exponential distribution and Gaussian distribution) may be used for the distribution characterizing the wireless link, channel conditions, or wireless propagation (e.g., wireless delays) between primary device 10A and secondary devices 10B and for the distribution characterizing the compute time of secondary devices 10B.

When secondary devices 10B are associated with primary device 10A (e.g., owned, operated, or otherwise known to a user of primary device 10A), processing may proceed to operation 164 via path 162. In these situations, primary device 10A may establish the set DEVSET of secondary devices 10B itself. Primary device 10A may therefore use inter-device communication links 42 (FIG. 2) to directly instruct secondary devices 10B to transmit their statistics (e.g., statistical parameters as gathered at operation 160) to primary device 10A. Primary device 10A may, for example, contact secondary devices 10B (e.g., a set of personal, family, and/or proximal devices 10) when collaboration on compute distribution has been configured and a related authentication protocol has been established. The statistical parameters can be supplied to primary device 10A and may be regularly updated by secondary devices 10B, may be measured directly and regularly updated by primary device 10A, or a hybrid approach may be used. Processing may subsequently proceed to operation 174.

When one or more secondary devices 10B are not associated with primary device 10A (e.g., are not owned, operated, or otherwise known to a user of primary device 10A), processing may proceed from operation 160 to operation 168 via path 166. At operation 168, primary device 10A may transmit a message to authentication server 50 via communication link 48 (FIG. 2). The message may request that authentication server 50 establish the set DEVSET of secondary devices 10B in place of primary device 10A.

At operation 170, authentication server 50 may instruct the secondary devices 10B in set DEVSET (e.g., via communication links 52 of FIG. 2) to begin communicating with primary device 10A via inter-device communication links 42. Authentication server 50 may, for example, instruct or trigger secondary devices 10B to transmit their most-recent statistical parameters (e.g., as gathered at operation 160) to primary device 10A and/or to other secondary devices 10B over inter-device communication links 42. Authentication server 50 may verify and authenticate the identity of each secondary device 10B as well as primary device 10A while maintaining anonymity between primary device 10A and secondary devices 10B. Authentication server 50 may, for example, select the secondary devices 10B to be included in set DEVSET (e.g., the secondary devices 10B that are registered with authentication server 50 and are located closest to primary device 10A, that exhibit the best statistical parameters for communicating with primary device 10A and/or for performing portions of compute task 46, or using any other desired criteria).

At operation 172, the secondary devices 10B in set DEVSET may transmit their statistical parameters to primary device 10A over inter-device communication links 42.

Secondary device 10B and primary device 10A may exchange information via inter-device communication links 42 using a token-based mechanism or an identity-based authentication mechanism (e.g., as brokered or controlled by authentication server 50) that allows the identity of secondary devices 10B to remain anonymous to the other secondary devices 10B and to primary device 10A and that allows the identity of primary device 10A to remain anonymous to secondary devices 10B. In this way, authentication server 50 may preserve the privacy of the user of primary device 10A and secondary devices 10B in situations where different users own or operate the devices.

At operation 174, primary device 10A may receive the statistical parameters from secondary devices 10B and may store the received statistical parameters in statistics 66 (FIG. 3).

If desired, primary device 10A may update the set DEVSET of secondary devices 10B based on statistics 66. The initialized secondary devices 10B in set DEVSET may continue to transmit their statistical parameters to primary device 10A (e.g., at operation 172) periodically over time (e.g., with a configurable periodicity), upon a pull request by primary device 10A, and/or upon a push secondary devices 10B (e.g., due to the occurrence of an event at the secondary device such as a loss of power, a sudden compute overload or connection loss, a loss of proximal status with respect to primary device 10A, etc.). In situations where one or more of the secondary devices is not associated with the user of primary device 10A, the initialized secondary devices 10B in set DEVSET may continue to transmit their statistical parameters to primary device 10A using their corresponding token-based secret ID's and using the token-based secret ID of primary device 10A, if applicable (e.g., as managed and verified by authentication server 50). If desired, primary device 10A may process the received statistical parameters to prune (remove) one or more secondary devices 10B from set DEVSET, such as secondary devices 10B that are deterministic stragglers (e.g., while processing operation 86 of FIG. 4).

In settings where secondary devices 10B are located in relatively close proximity to primary device 10A (e.g., so-called proximal settings), the signaling between primary device 10A and secondary devices 10B (e.g., over inter-device communication links 42) may occur on the physical (PHY) layer (e.g., using a standardized peer-to-peer (P2P) channel, an implementation in sub-THz/THz spectrum, etc.). For location-independent settings (e.g., where one or more of the secondary devices 10B in set DEVSET are not located in close proximity to primary device 10A), the signaling of inter-device communication links 42 may occur over-the-top as regular data communication workload.

At operation 176, primary device 10A may use statistics 66 (e.g., the stored statistical parameters received from the secondary devices 10B in set DEVSET) to identify the expected performance gain associated with distributing compute task 46 to set DEVSET. Primary device 10A may then use the expected performance gain to determine whether to distribute compute task 46 or to perform compute task 46 locally (e.g., while processing operation 90 of FIG. 4).

The example of FIG. 8 is illustrative and non-limiting. In other implementations (e.g., for non-real-time applications), primary device 10A may apply for a distributed ledger contract to receive compute workload from or to distribute compute workload to other devices in the distributed ledger contract system. If desired, a portion of compute task 46 as described herein may be performed locally by primary device 10A while other portions of compute task 46 are distributed to the secondary devices 10B in set DEVSET. If desired, some of the DC functions of primary device 10A as described herein may be offloaded onto other devices that are different from primary device 10A (e.g., statistics engine 64 of FIG. 3 may be implemented on a different device that is communicably coupled to primary device 10A, etc.). Any of the secondary devices 10B described herein may become a primary device such as primary device 10A when the secondary device has a compute task 46 that may be distributed among many devices 10.

Similarly, primary device 10A as described herein may also serve as a secondary device that processes a share of a compute task for another primary device 10 as needed.

Devices 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-8 may be performed by the components of devices 10 and/or authentication server 50 using software, firmware, and/or hardware (e.g., dedicated circuitry or hardware). Software code for performing these operations may be stored on non-transitory computer readable storage media (e.g., tangible computer readable storage media) stored on one or more of the components of device 10 or authentication server 50 (e.g., storage circuitry 14 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 or authentication server 50 (e.g., processing circuitry 16 of FIG. 1, etc.). The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth in the example section below. For example, circuitry associated with an electronic device, authentication server, one or more processors, etc. as described above in connection with one or more of the preceding figures may be configured to operate in accordance with one or more of the examples set forth below in the example section.

EXAMPLES

In the following sections, further exemplary aspects are provided.

Example 1 includes an electronic device comprising: one or more antennas configured to receive signals from a set of one or more electronic devices, the signals including an indication of a capability of the one or more electronic devices in the set; and one or more processors configured to use the one or more antennas to distribute a compute task to the set of one or more electronic devices based on the indication in the signals received by the one or more antennas.

Example 2 includes the method of example 1 or some other example or combination of examples herein, wherein the capability comprises a communication capability associated with wireless communications between the electronic device and the set of one or more electronic devices.

Example 3 includes the method of any one of examples 1 or 2 or some other example or combination of examples herein, wherein the capability comprises a compute capability of the set of one or more electronic devices.

Example 4 includes the method of any one of examples 1-3 or some other example or combination of examples herein, wherein the indication comprises a rate parameter and a location parameter of a shifted exponential distribution.

Example 5 includes the method of any one of examples 1-4 or some other example or combination of examples herein, wherein the set of one or more electronic devices comprises a plurality of electronic devices having heterogeneous compute capabilities.

Example 6 includes the method of any one of examples 1-5 or some other example or combination of examples herein, wherein the set of one or more electronic devices comprises a plurality of electronic devices having heterogeneous communication characteristics.

Example 7 includes the method of any one of examples 1-6 or some other example or combination of examples herein, the one or more processors being configured to perform the compute task locally when the indication indicates that distributing the compute task to the set of one or more electronic devices will take an amount of time that exceeds a threshold value.

Example 8 includes the method of any one of examples 1-7 or some other example or combination of examples herein, the one or more antennas being configured to transmit control signals to the set of one or more electronic devices, the control signals identifying respective shares of the compute task for the one or more electronic devices in the set, and the one or more antennas being configured to receive compute results of the compute task from the set of one or more electronic devices.

Example 9 includes the method of any one of examples 1-8 or some other example or combination of examples herein, wherein the one or more processors is configured to code the compute task to introduce a redundancy between the respective shares of the compute task.

Example 10 includes the method of any one of examples 1-9 or some other example or combination of examples herein, wherein the one or more processors is configured to generate a subset of the set of one or more electronic devices by removing one or more electronic devices from the set based on the indication, the one or more processors being configured to use the one or more antennas to distribute the compute task to the subset of the set of one or more electronic devices.

Example 11 includes the method of any one of examples 1-10 or some other example or combination of examples herein, wherein the one or more processors is configured to instruct the subset of the set of one or more electronic devices to transmit, to the electronic device, an update of the indication.

Example 12 includes the method of any one of examples 1-11 or some other example or combination of examples herein, wherein the one or more processors is configured to use the one or more antennas to transmit a message to an authentication server that requests that the authentication server instruct the set of one or more electronic devices to transmit the signals to the electronic device.

Example 13 includes a method of operating an electronic device, the method comprising: with one or more antennas, receiving statistics from a set of electronic devices that are different from the electronic device; with one or more processors, using the one or more antennas to distribute a compute task to the set of electronic devices when the statistics indicate that distributing the compute task to the set of electronic devices is expected to produce a first amount of performance gain relative to performing the compute task locally on the electronic device; and with the one or more processors, performing the compute task locally when the statistics indicate that distributing the compute task to the set of electronic devices is expected to produce a second amount of performance gain that is less than the first amount of performance gain.

Example 14 includes the method of example 13 or some other example or combination of examples herein, further comprising: with the one or more processors, using the one or more antennas to distribute the compute task to a subset of the set of electronic devices when the statistics indicate that distributing the compute task to the subset of the set of electronic devices will produce a third amount of performance gain that is greater than the first amount of performance gain.

Example 15 includes the method of any one of examples 13, 14, or some other example or combination of examples herein, further comprising: with the one or more processors, generating a subset of the set of electronic devices by removing one or more deterministic straggler devices from the set of electronic devices based on the statistics; and with the one or more processors, distributing the compute task to the subset of the set of electronic devices.

Example 16 includes the method of any one of examples 13-15 or some other example or combination of examples herein, wherein using the one or more antennas to distribute the compute task to the set of electronic devices comprises coding redundancy into respective shares of the compute task distributed to different electronic devices in the set of electronic devices.

Example 17 includes the method of any one of examples 13-16 or some other example or combination of examples herein, further comprising: with the one or more antennas, instructing the set of electronic devices to transmit the statistics to the electronic device.

Example 18 includes the method of any one of examples 13-17 or some other example or combination of examples herein, further comprising: with the one or more antennas, transmitting a message to an authentication server that requests that the authentication server instruct the set of electronic devices to transmit the statistics to the electronic device.

Example 19 includes a method of operating a first electronic device comprising: with one or more antennas, receiving a signal from a second electronic device; with one or more processors, identifying based on the signal received from the second electronic device, an expected performance of the second electronic device in performing the compute task; and with the one or more processors, using the one or more antennas to distribute a portion of the compute task to the second electronic device when the expected performance exceeds a threshold level.

Example 20 includes the method of example 19 or some other example or combination of examples herein, wherein the expected performance comprises a time or an amount of energy expected to be required by the second electronic device to complete the portion of the compute task.

Example 21 includes a wireless communication device comprising: one or more antennas configured to receive signals from a set of electronic devices remote from the electronic device; and one or more processors configured to use the one or more antennas to distribute respective shares of a compute task between the electronic devices in the set of electronic devices according to a distribution scheme, the distribution scheme being based on wireless delays and compute delays identified by the signals received from the set of electronic devices.

Example 22 includes the wireless communication of example 21 or some other example or combination of examples herein, the one or more antennas being configured to transmit additional signals to the set of electronic devices that identify the respective shares of the compute task and the one or more antennas being configured to receive, from the set of electronic devices, compute results associated with the respective shares of the compute task.

Example 23 includes the wireless communication of any one of examples 21, 22, or some other example or combination of examples herein, wherein the wireless delays comprise first wireless delays associated with transmission of the additional signals to the set of electronic devices and second wireless delays associated with reception of the compute results from the set of electronic devices.

Example 24 includes the wireless communication of any one of examples 21-23 or some other example or combination of examples herein, wherein the distribution scheme assigns a first share of the compute task to a first electronic device from the set of electronic devices and assigns a second share of the compute task that is less than the first share to a second electronic device of the set of electronic devices.

Example 25 includes the wireless communication of any one of examples 21-24 or some other example or combination of examples herein, wherein the first electronic device has a first combined delay given by a first compute delay, a first transmission delay, and a first bandwidth identified by the signals and the second electronic device has a second combined delay give n by a second compute delay, a second transmission delay, and a second bandwidth identified by the signals, the second combined delay being greater than the first combined delay.

Example 26 includes the wireless communication of any one of examples 21-25 or some other example or combination of examples herein, wherein the distribution scheme is based on a radio resource allocation of the set of electronic devices.

Example 27 includes the wireless communication of any one of examples 21-26 or some other example or combination of examples herein, wherein the distribution scheme is based on one or more scheduling grants for the set of electronic devices.

Example 28 includes the wireless communication of any one of examples 21-27 or some other example or combination of examples herein, wherein the signals comprise statistical parameters that identify the wireless delay and the compute delay for each electronic device in the set of electronic devices.

Example 29 includes the wireless communication of any one of examples 21-28 or some other example or combination of examples herein, wherein the statistical parameters comprise shifted exponential distributions, Weibull distributions, or Gaussian distributions.

Example 30 includes a method of operating a first electronic device, the method comprising: with one or more antennas, receiving a first signal from a second electronic device; with one or more processors, generating a first share of a compute task for the second electronic device based on a first wireless delay and a first compute delay identified from the first signal, the first wireless delay being associated with wireless transmission from the first electronic device to the second electronic device and the first compute delay being associated with processing resources on the second electronic device; with the one or more antennas, transmitting a first control signal to the second electronic device that instructs the second electronic device to perform the first share of the compute task; and with the one or more antennas, receiving a first compute result for the first share of the compute task from the second electronic device.

Example 31 includes the method of example 30 or some other example or combination of examples herein, further comprising: with the one or more processors, generating the first share of the compute task based on a second wireless delay identified from the first signal, the second wireless delay being associated with wireless transmission from the second electronic device to the first electronic device.

Example 32 includes the method of any one of examples 30, 31, or some other example or combination of examples herein, further comprising: with the one or more antennas, receiving a second signal from a third electronic device; with the one or more processors, generating a second share of the compute task for the third electronic device based on a third wireless delay and a second compute delay identified from the second signal, the third wireless delay being associated with wireless transmission from the first electronic device to the third electronic device and the second compute delay being associated with processing resources on the third electronic device; with the one or more antennas, transmitting a second control signal to the third electronic device that instructs the third electronic device to perform the second share of the compute task; and with the one or more antennas, receiving a second compute result for the second share of the compute task from the third electronic device.

Example 33 includes the method of any one of examples 30-32 or some other example or combination of examples herein, further comprising: with the one or more processors, generating the second share of the compute task based on a fourth wireless delay identified by the second signal, the fourth wireless delay being associated with wireless transmission from the third electronic device to the first electronic device.

Example 34 includes the method of any one of examples 30-33 or some other example or combination of examples herein, wherein transmitting the first control signal comprises transmitting the first control signal with a first bandwidth and transmitting the second control signal comprises transmitting the second control signal with a second bandwidth that is different from the first bandwidth.

Example 35 includes the method of any one of examples 30-34 or some other example or combination of examples herein, wherein generating the first share of the compute task comprises generating the first share of the compute task based on a radio resource allocation of the second electronic device and the third electronic device.

Example 36 includes the method of any one of examples 30-35 or some other example or combination of examples herein, wherein a sum of the first wireless delay, the first compute delay, and the second wireless delay is greater than a sum of the third wireless delay, the second compute delay, and the fourth wireless delay, the sum of the first wireless delay, the first compute delay, and the second wireless delay being less than a time required by the first electronic device to perform the compute task.

Example 37 includes the method of any one of examples 30-36 or some other example or combination of examples herein, wherein there is at least some redundancy between the first share and the second share of the compute task.

Example 38 includes a method of operating a wireless communication device, the method comprising: with one or more processors, using one or more antennas to distribute a first compute task among a set of electronic devices; with the one or more antennas, receiving statistical parameters from the set of electronic devices; with the one or more processors, updating the set of electronic devices based on the statistical parameters received from the set of electronic devices; and with the one or more processors, using the one or more antennas to distribute a second compute task among the updated set of electronic devices.

Example 39 includes the method of example 38 or some other example or combination of examples herein, wherein receiving the statistical parameters comprises receiving the statistical parameters using a token-based secret identification of the electronic device.

Example 40 includes the method of any one of examples 38, 39, or some other example or combination of examples herein, wherein receiving the statistical parameters comprises receiving the radio-frequency signals with a configurable periodicity.

Example 41 may include an apparatus comprising means to perform one or more elements of a method described in or related to any of examples 1-40 or any combination thereof, or any other method or process described herein.

Example 42 may include one or more non-transitory computer-readable media comprising instructions to cause an electronic device, upon execution of the instructions by one or more processors of the electronic device, to perform one or more elements of a method described in or related to any of examples 1-40 or any combination thereof, or any other method or process described herein.

Example 43 may include an apparatus comprising logic, modules, or circuitry to perform one or more elements of a method described in or related to any of examples 1-40 or any combination thereof, or any other method or process described herein.

Example 44 may include a method, technique, or process as described in or related to any of examples 1-40 or any combination thereof, or portions or parts thereof.

Example 45 may include an apparatus comprising: one or more processors and one or more non-transitory computer-readable storage media comprising instructions that, when executed by the one or more processors, cause the one or more processors to perform the method, techniques, or process as described in or related to any of examples 1-40, or any combination thereof, or portions thereof.

Example 46 may include a signal as described in or related to any of examples 1-40, or any combination thereof, or portions or parts thereof.

Example 47 may include a datagram, information element, packet, frame, segment, PDU, or message as described in or related to any of examples 1-40, or any combination thereof, or portions or parts thereof, or otherwise described in the present disclosure.

Example 47 may include a signal encoded with data as described in or related to any of examples 1-40, or any combination thereof, or portions or parts thereof, or otherwise described in the present disclosure.

Example 48 may include a signal encoded with a datagram, IE, packet, frame, segment, PDU, or message as described in or related to any of examples 1-40, or any combination thereof, or portions or parts thereof, or otherwise described in the present disclosure.

Example 49 may include an electromagnetic signal carrying computer-readable instructions, wherein execution of the computer-readable instructions by one or more processors is to cause the one or more processors to perform the method, techniques, or process as described in or related to any of examples 1-40, or any combination thereof, or portions thereof.

Example 50 may include a computer program comprising instructions, wherein execution of the program by a processing element is to cause the processing element to carry out the method, techniques, or process as described in or related to any of examples 1-40, or any combination thereof, or portions thereof.

Example 51 may include a signal in a wireless network as shown and described herein.

Example 52 may include a method of communicating in a wireless network as shown and described herein.

Example 53 may include a system for providing wireless communication as shown and described herein.

Example 54 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

What is claimed is:

1. A wireless communication device comprising:

one or more antennas configured to receive signals from a set of electronic devices that are remote from the wireless communication device; and one or more processors configured to use the one or more antennas to distribute respective shares of a compute task between the electronic devices in the set of electronic devices according to a distribution scheme, wherein the distribution scheme is based on wireless delays and compute delays identified by the signals received from the set of electronic devices, the distribution scheme assigns a first share of the compute task to a first electronic device from the set and a second share of the compute task that is less than the first share to a second electronic device from the set, the first electronic device has a first combined delay that includes a first compute delay, a first transmission delay, and a first bandwidth identified by the signals, and the second electronic device has a second combined delay that is greater than the first combined delay and that includes a second compute delay, a second transmission delay, and a second bandwidth identified by the signals.

2. The wireless communication device of claim 1, the one or more antennas being configured to transmit additional signals to the set of electronic devices that identify the respective shares of the compute task and the one or more antennas being configured to receive, from the set of electronic devices, compute results associated with the respective shares of the compute task.

3. The wireless communication device of claim 2, wherein the wireless delays comprise first wireless delays associated with transmission of the additional signals to the set of electronic devices and second wireless delays associated with reception of the compute results from the set of electronic devices.

4. The wireless communication device of claim 1, wherein the distribution scheme is based on a radio resource allocation of the set of electronic devices.

5. The wireless communication device of claim 1, wherein the distribution scheme is based on one or more scheduling grants for the set of electronic devices.

6. The wireless communication device of claim 1, wherein the signals comprise statistical parameters that identify, for each electronic device in the set of electronic devices, a respective wireless delay of the wireless delays and a respective compute delay of the compute delays.

7. The wireless communication device of claim 6, wherein the statistical parameters comprise shifted exponential distributions, Weibull distributions, or Gaussian distributions.

8. A method of operating a first electronic device, the method comprising:

receiving, using one or more antennas, a first signal from a second electronic device;

transmitting, using the one or more antennas, a first control signal to the second electronic device that instructs the second electronic device to perform a first share of a compute task, wherein the first share of the compute task is based on a first wireless delay, a second wireless delay, and a first compute delay identified from the first signal, the first wireless delay is associated with wireless transmission from the first electronic device to the second electronic device, the second wireless delay is associated with wireless transmission from the second electronic device to the first electronic device, and the first compute delay is associated with processing resources on the second electronic device;

receiving, using the one or more antennas, a first compute result for the first share of the compute task from the second electronic device;

receiving, using the one or more antennas, a second signal from a third electronic device;

transmitting, using the one or more antennas, a second control signal to the second electronic device that instructs the second electronic device to perform a second share of the compute task, wherein the second share of the compute task is based on a third wireless delay and a second compute delay identified from the second signal, the third wireless delay is associated with wireless transmission from the first electronic device to the third electronic device, and the second compute delay is associated with processing resources on the third electronic device; and receiving, using the one or more antennas, a second compute result for the second share of the compute task from the third electronic device.

9. The method of claim 8, wherein the second share of the compute task is based on a fourth wireless delay identified by the second signal, and the fourth wireless delay is associated with wireless transmission from the third electronic device to the first electronic device.

10. The method of claim 9, wherein transmitting the first control signal comprises transmitting the first control signal with a first bandwidth and transmitting the second control signal comprises transmitting the second control signal with a second bandwidth that is different from the first bandwidth.

11. The method of claim 9, wherein the first share of the compute task is based on a radio resource allocation of the second electronic device and the third electronic device.

12. The method of claim 9, wherein a sum of the first wireless delay, the first compute delay, and the second wireless delay is greater than a sum of the third wireless delay, the second compute delay, and the fourth wireless delay, the sum of the first wireless delay, the first compute delay, and the second wireless delay being less than a time required by the first electronic device to perform the compute task.

13. The method of claim 8, wherein there is at least some redundancy between the first share and the second share of the compute task.

14. A method of operating a wireless communication device comprising:

receiving, using one or more radio-frequency receivers, signals from a set of electronic devices that are remote from the wireless communication device; and distributing, using one or more processors and one or more radio-frequency transmitters, respective shares of a compute task between the electronic devices in the set of electronic devices according to a distribution scheme, wherein the distribution scheme is based on wireless delays and compute delays identified by the signals received from the set of electronic devices, the distribution scheme assigns a first share of the compute task to a first electronic device from the set and a second share of the compute task that is less than the first share to a second electronic device from the set, the first electronic device has a first combined delay that includes a first compute delay, a first transmission delay, and a first bandwidth identified by the signals, and the second electronic device has a second combined delay that is greater than the first combined delay and that includes a second compute delay, a second transmission delay, and a second bandwidth identified by the signals.

15. The method of claim 14, further comprising:

transmitting, using the one or more transmitters, additional signals to the set of electronic devices that identify the respective shares of the compute task and the one or more antennas being configured to receive, from the set of electronic devices, compute results associated with the respective shares of the compute task.

16. The method of claim 15, wherein the wireless delays comprise first wireless delays associated with transmission of the additional signals to the set of electronic devices and second wireless delays associated with reception of the compute results from the set of electronic devices.

17. The method of claim 14, wherein the distribution scheme is based on a radio resource allocation of the set of electronic devices.

18. The method of claim 14, wherein the distribution scheme is based on one or more scheduling grants for the set of electronic devices.

19. The method of claim 14, wherein the signals comprise statistical parameters that identify, for each electronic device in the set of electronic devices, a respective wireless delay of the wireless delays and a respective compute delay of the compute delays.

20. The method of claim 19, wherein the statistical parameters comprise shifted exponential distributions, Weibull distributions, or Gaussian distributions.

* * * * *